United States Patent
Shafiee et al.

(10) Patent No.: US 9,098,338 B2
(45) Date of Patent: Aug. 4, 2015

(54) WORK FLOW COMMAND PROCESSING SYSTEM

(75) Inventors: Mohammad Reza Shafiee, Ridgefield, CT (US); Sumeet Garg, Mandi Gobindgarth (IN); Wei Liu, Flower Mound, TX (US); Ashutosh K. Sureka, Irving, TX (US); Michael J. Naggar, Frisco, TX (US); Vinay Kumar Mishra, Hyderabad (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 617 days.

(21) Appl. No.: 12/971,004

(22) Filed: Dec. 17, 2010

(65) Prior Publication Data

US 2012/0159503 A1    Jun. 21, 2012

(51) Int. Cl.
*G06F 9/46*   (2006.01)
*G06F 9/50*   (2006.01)

(52) U.S. Cl.
CPC ............ *G06F 9/5038* (2013.01); *G06F 9/5066* (2013.01); *G06F 9/5072* (2013.01)

(58) Field of Classification Search
None
See application file for complete search history.

(56) References Cited

U.S. PATENT DOCUMENTS

| | | | | |
|---|---|---|---|---|
| 6,209,112 B1* | 3/2001 | Stevenson | ...................... | 714/752 |
| 6,643,663 B1* | 11/2003 | Dabney et al. | ......................... | 1/1 |
| 6,651,121 B1* | 11/2003 | Zurawski et al. | ............. | 710/100 |
| 6,728,947 B1* | 4/2004 | Bengston | ....................... | 717/103 |
| 7,996,488 B1* | 8/2011 | Casabella et al. | ............. | 709/217 |
| 2003/0158913 A1* | 8/2003 | Agnoli et al. | .................. | 709/219 |
| 2007/0079282 A1* | 4/2007 | Nachnani et al. | ............. | 717/106 |
| 2007/0294697 A1* | 12/2007 | Theimer et al. | ................ | 718/102 |
| 2009/0031377 A1* | 1/2009 | Jacobs | ........................... | 725/105 |
| 2009/0172685 A1* | 7/2009 | Shavit | ........................... | 718/103 |

OTHER PUBLICATIONS

Dealing With Business Process Evolution Using Versions Mohamed Amine Chaâbane, Eric Andonoff, Lotfi Bouzgenda, Rafik Bouaziz Proceedings of ICE-B 2008, pp. 267-278 Published Jul. 29, 2008.*
Merging Application-centric and Data-centric Approaches to Support Transaction-oriented Multi-system Workflows Y. Breitbart, A. Deacon, H.-J. Schek, A. Sheth, G. Weikum Published: 1993.*

* cited by examiner

*Primary Examiner* — Emerson Puente
*Assistant Examiner* — Paul Mills

(57) ABSTRACT

A method including receiving a work flow for the ingestion, transformation, and distribution of content, wherein the work flow includes one or more work unit tasks; selecting one of the one or more work unit tasks for execution when resources are available; retrieving work unit task information that includes a work unit definition that specifies which of the one or more other work unit tasks are capable of being at least one of an input to the one of the one or more work unit tasks or an output for the one of the one or more work unit tasks, and work unit task connector parameters that specify a type of input content and a type of output content; and executing the one of the one or more work unit tasks based on a translated work unit task information.

20 Claims, 20 Drawing Sheets

WORK FLOW COMMAND PROCESSING SYSTEM

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION

Figure 1:
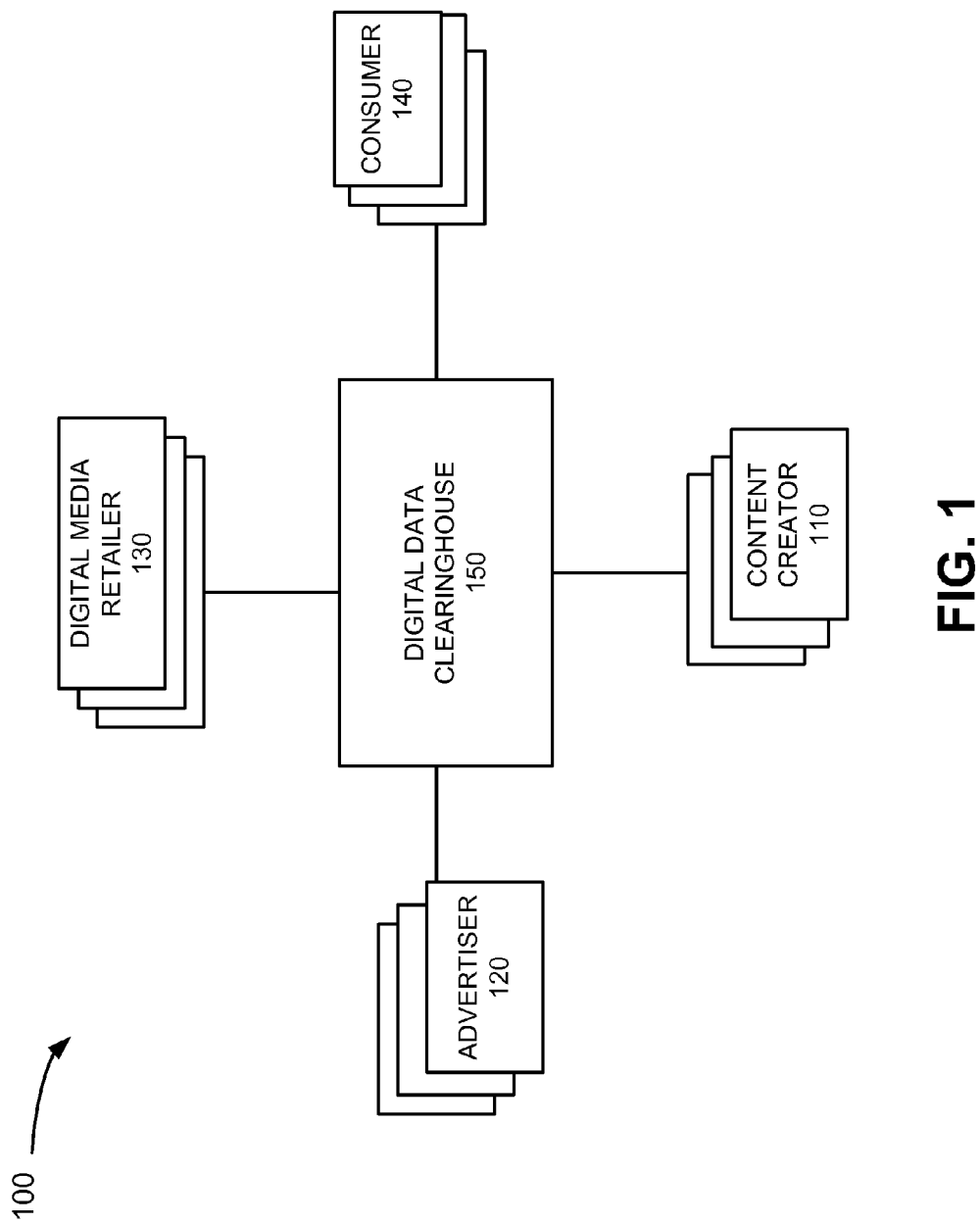
FIG. 1 is a diagram illustrating an exemplary network that includes a digital distribution clearinghouse (DDC) for processing content.

The following detailed description refers to the accompanying drawings. The same reference numbers in different drawings may identify the same or similar elements.

The term "content," as used herein, may include for example, multimedia content (e.g., text-based content, audio and video such as a movie, a show, a television program, broadcast of a live event (e.g., sporting event, concert, etc.)), or another type of content or asset.

As described herein, a digital data clearinghouse (DDC) may allow a user to define or create work units, use these work units to compose a work flow and, to dynamically provide for customer-requested processes for content distribution. When the user submits a service order for processing content on behalf of a customer, the DDC may obtain, from the work flow associated with a work order, work unit tasks that correspond to the work units. The DDC may perform all or some of these tasks.

The term "work unit," as used herein, may refer to a description of a set of one or more operations that the DDC may perform pertaining to the ingestion, transformation, and distribution of content. For example, the transforming of content may include overlaying subtitles on a video, inserting advertisements into a video, transcoding content from one format to another format, etc. A further description of a work unit is provided below.

The term "work flow," as used herein, may refer to one or more work units that may be executed to fulfill a work flow task associated with a work order. For example, a work unit may include an input and an output to allow a series of work units to form a processing path through which content may flow.

The term "work order," as used herein, may refer to an order (e.g., associated with a customer) that is received for processing by the DDC. A work order may include a work flow, criteria for the selection of the content to be processed in the work flow, and the parameter values for the work units pertaining to the work flow. For example, the parameters may include system parameters that may not be changeable, default parameters that may be changeable, and default parameters that may require human intervention (e.g., user verification, user entry, etc.).

The term "work unit task," as used herein, may refer to particular function or operation that may be performed based on a work unit. A work unit may perform one or more work unit tasks.

According to an exemplary scenario, assume that a user (e.g., a DDC operator, a DDC administrator, etc.) defines two work units via the DDC. Also assume that the first work unit describes reformatting an M×N video into a 600×400 video, and the second work unit describes inserting an advertisement into the video. When a customer (e.g., a content creator, a content provider, etc.) places an order with the user to reformat the video into a 600×400 video and insert an advertisement in the video, the user may compose, through a graphical user interface (GUI) provided via the DDC, a work flow by concatenating two or more work units. When the user submits a work order, the DDC may schedule for execution a set of tasks that are associated with the work units included in the work flow. The DDC may then perform the tasks. The preceding example is provided for simplicity. Descriptions below provide additional details with respect to the DDC. In particular, a work flow command processing system will be described further below.

FIG. 1 is a diagram of an exemplary network 100 that includes a DDC for processing content. Referring to FIG. 1, network 100 includes one or more content creators 110, one or more advertisers 120, one or more digital media retailers (DMRs) 130, one or more consumers 140 and digital data clearinghouse (DDC) 150.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user-generated content (UGC), websites, blog sites, etc. Content creators 110 may provide content to DDC 150 for formatting (e.g., transcoding, etc.), packaging and/or distribution, as described further below.

Advertiser 120 (referred to collectively as advertisers 120 or individually as advertiser 120) may represent one or more parties that wish to insert advertising into content. For example, advertiser 120 may contract with a content creator 110 and/or digital media retailer 130 to insert an advertisement into a media stream provided to consumers 140. DDC 150 may insert the advertisement into the media stream in accordance with the agreement between the parties.

DMR 130 may represent one or more business entities that receive content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive content from DDC 150 and sell/provide the content to consumers 140.

Consumer 140 may represent one or more consumers 140 that receive content originally generated by or provided by content creators 110 and that has been processed by DDC 150. For example, DDC 150 may format and package the content for distribution by DMRs 130 and/or DDC 150 to consumers 140.

DDC 150 may include one or more devices (e.g., a server device, a computing device, etc.) for processing content. For example, as described above, DDC 150 may provide an automated environment in which content from content creators 110 is transformed and packaged for distribution in any number of formats, based on the particular requirements associated with DMRs 130. According to an exemplary embodiment, DDC 150 may also aggregate various data and insert advertisements into the content. DDC 150, consistent with embodiments described herein, may also utilize flexible work flows to streamline the formatting and packaging of content for digital distribution.

According to other embodiments, network 100 may include additional devices, fewer devices, different devices, and/or a different configuration than those illustrated in FIG. 1. For example, network 100 may include a large number (e.g., hundreds or thousands) of different types of user device associated with consumers 140, such as, for example, televisions, cellular phones, computers (e.g., laptops, desktops, tablets, notebooks, netbooks, etc.), personal digital assistants (PDAs), etc. Additionally, or alternatively, according to other exemplary embodiments, network 100 may include additional DDCs 150, etc. Additionally, or alternatively, network 100 may include one or more networks of various types to interconnect the devices illustrated in FIG. 1 and enable the devices to communicate with one another. For example, network 100 may include a public switched telephone network (PSTN), a local area network (LAN), a wide area network (WAN), the Internet, an intranet, or some other type of network. Network 110 may include wired connections and/or wireless connections among the devices illustrated.

Also, according to other embodiments, one or more functions and/or processes described as being performed by a particular device or component may be performed by a different device or component, or some combination of devices or components. Additionally, or alternatively, according to other embodiments, one or more functions and/or processes described as being performed by multiple devices or multiple components may be performed by different devices or components, or a single device, etc.

Figure 2:
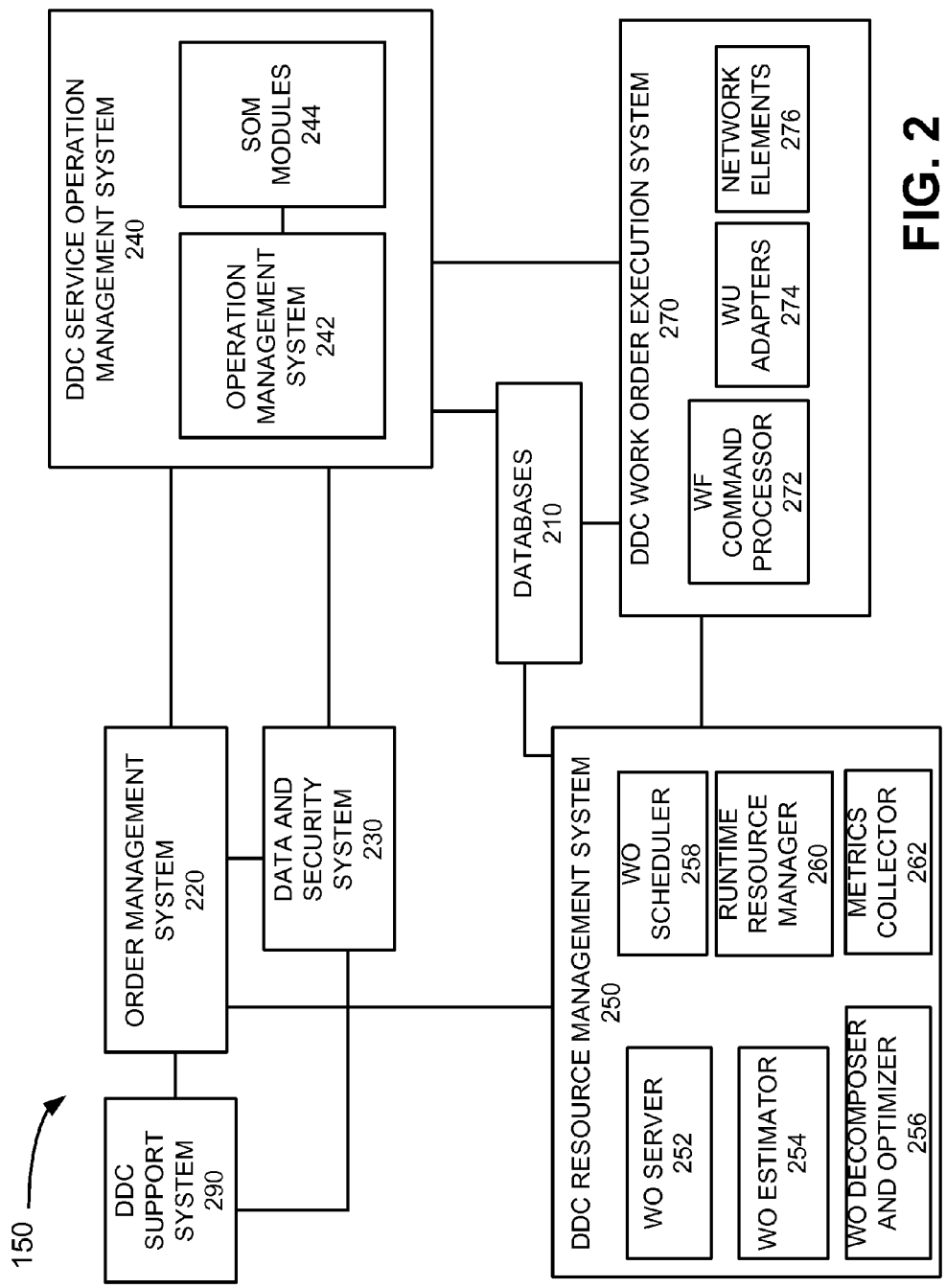
FIG. 2 is a diagram illustrating an exemplary embodiment of the DDC illustrated in FIG. 1.

FIG. 2 illustrates an exemplary embodiment of DDC 150. Referring to FIG. 2, DDC 150 may include databases 210, order management system 220, data and security system 230, DDC service operation management system 240, DDC resource management system 250, DDC work order execution system 270, and DDC support system 290.

Databases 210 may store work unit definitions, work flows, parameters, tables, etc., that are associated with various devices, components, etc., in DDC 150, intermediate or end results of processing performed by different processes in DDC 150, etc.

Order management system 220 may include one or more devices (e.g., a server device, a computing device, etc.) for managing customer orders, generating reports, etc. According to an exemplary embodiment, order management system 220 may include client components that interface with components of DDC service operation management system 240. The client components (e.g., web browser) may receive customer orders, requests for reports, etc., and relay the received information to the components of DDC service operation management system 240 for the creation, validation, estimation, submission, approval, execution and reporting of activities associated with the customer orders, request for reports, etc. For example, a customer order may be completed by sending, to a component of DDC service operation management system 240, a selection of a particular work flow that will drive the processing of content associated with the order.

Data and security system 230 may include one or more devices (e.g., a server device, a computing device, etc.) to provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose work flows. According to an exemplary embodiment, data and security system 230 may interface with order management system 220, DDC service operation management system 240, and DDC support system 290.

DDC service operation management system 240 may include one or more devices (e.g., a server device, a computing device, etc.) to control an overall operation, configuration, and management of DDC 150. For example, DDC service operation management system 240 may include operation management system 242 and service operation management modules 244. Via a client component that communicates with operation management system 242, a user may control the configuration, administration and operation of DDC 150. For example, in one implementation, via a web browser or another client application, a user may control security, compose a work flow, administer accounts that are associated with content creator 110 or DMR 130, submit a work order, add data to storage of DDC 150, manage resources, manage DDC configuration (e.g., create a work unit), manage catalogs of content, run reports, monitor DDC work orders (e.g., information associated with a work order), etc.

In providing each of such services to a client, operation management system 242 may employ service operation management (SOM) modules 244. SOM modules 244 may include components that correspond to the above-listed services. For example, SOM modules 244 may include a security manager, a work flow manager, an account manager, a work order manager, a data and storage manager, a resource management module, a configuration manager, an asset management module, a catalog management module, a monitoring and reporting module, etc. DDC service operation management system 240 may further include a graphical user interface (GUI) for interfacing with SOM modules 244.

DDC resource management system 250 may include one or more devices (e.g., a server device, a computing device, etc.) that support the capacity management of resources associated with network elements (NEs) of DDC 150. As illustrated in FIG. 2, DDC resource management system 250 may include a work order server 252, a work order estimator 254, a work order decomposer and optimizer 256, a work order scheduler 258, a runtime resource manager 260, and a metrics collector 262.

Work order server 252 may provide work order-related interfaces to operation management system 242 and/or SOM modules 244, and may communicate with work order estimator 254, work order decomposer and optimizer 256, and work order scheduler 258 to submit, decompose, validate, and save work orders, and to estimate, schedule, and reserve resources during an order submission.

Work order estimator 254 may estimate the cost of completing a decomposed work order across work units of a work flow, based on resources that are associated with the work units for each resource type. Work order estimator 254 may store the cost in one of databases 210 in terms of resource capacity units (RCUs) and duration of time required to complete work unit tasks, sub-work unit tasks, processes, etc., which may pertain to the execution of the work order. The term "RCU", as used herein, may include a unit of measure for a resource type. For example, an RCU may correspond to bits per second, tasks per hour, CPU processing time, etc., or some other type of quantity of unit (e.g., capacity unit) by time (e.g., a time unit, such as, hour, minute, second, millisecond, etc.), quantity of unit (e.g., gigabyte (GB) for storage, megabits for bandwidth, etc), etc.

Work order decomposer and optimizer 256 may break down an order into work units based on the work flow associated with the order. Furthermore, based on the decomposition, work order decomposer and optimizer 256 may generate work unit tasks, or simply "tasks," assign work unit task parameters, create work unit task connectors, etc., which are described further below.

Work order scheduler 258 may match cost estimates for different resource types for a work order to available time slots in an allocation schedule across different network elements (e.g., hardware/software components that perform underlying operations for a work unit). As a result of the scheduling, work order scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular content.

DDC work order execution system 270 may include one or more devices (e.g., a server device, a computing device, etc.) to manage the flow and execution of work units of a defined work flow associated with a work order. DDC work order execution system 270 may include a work flow command processor 272, work unit adapters 274, and network elements 276. For simplicity, FIG. 2 does not illustrate other components of DDC work order execution system 270. For example, DDC work order execution system 270 may include a work unit processor (not illustrated). Depending on the implementation, DDC work order execution system 270 may include additional, fewer, or different components than those illustrated in FIG. 2.

Work flow command processor 272 may drive work order execution. According to an exemplary embodiment, work flow command processor 272 may include a work order manager, a work order processor, and a work unit processor (not illustrated). The work order manager may provide interfaces to resource management system 250 for initiating an execution of a work order, retrieving the status of the work order, suspending/resuming the work order execution, canceling the work order, etc. The work order processor may coordinate work unit tasks for completion of a work order. In coordinating different work unit tasks, the work order processor may sequence the tasks for optimum execution time and resource utilization. The work order processor may communicate with runtime resource manager 260 for allocation and de-allocation of resources. The work unit processor may dispatch processes/threads to perform a work unit task. A further description of work flow command processor 272 is provided below.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for ingesting, transforming, and distributing content.

DDC support system 290 may include one or more devices (e.g., a server device, a computing device, etc.) and/or personnel to provide support services, such as creation of work units, composition of work flows, etc., billing support, contracting management, pricing, etc.

According to other exemplary embodiments, DDC 150 may include additional, fewer, different, and/or a different arrangement of devices than those illustrated in FIG. 2. The configuration shown in FIG. 2 is for illustrative purposes. In other configurations and/or implementations, functions that are associated with one component illustrated in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2. For example, according to an exemplary embodiment, DDC resource management system 250 may include a component for providing reports on resources, schedules, metrics, etc.

Figure 3:
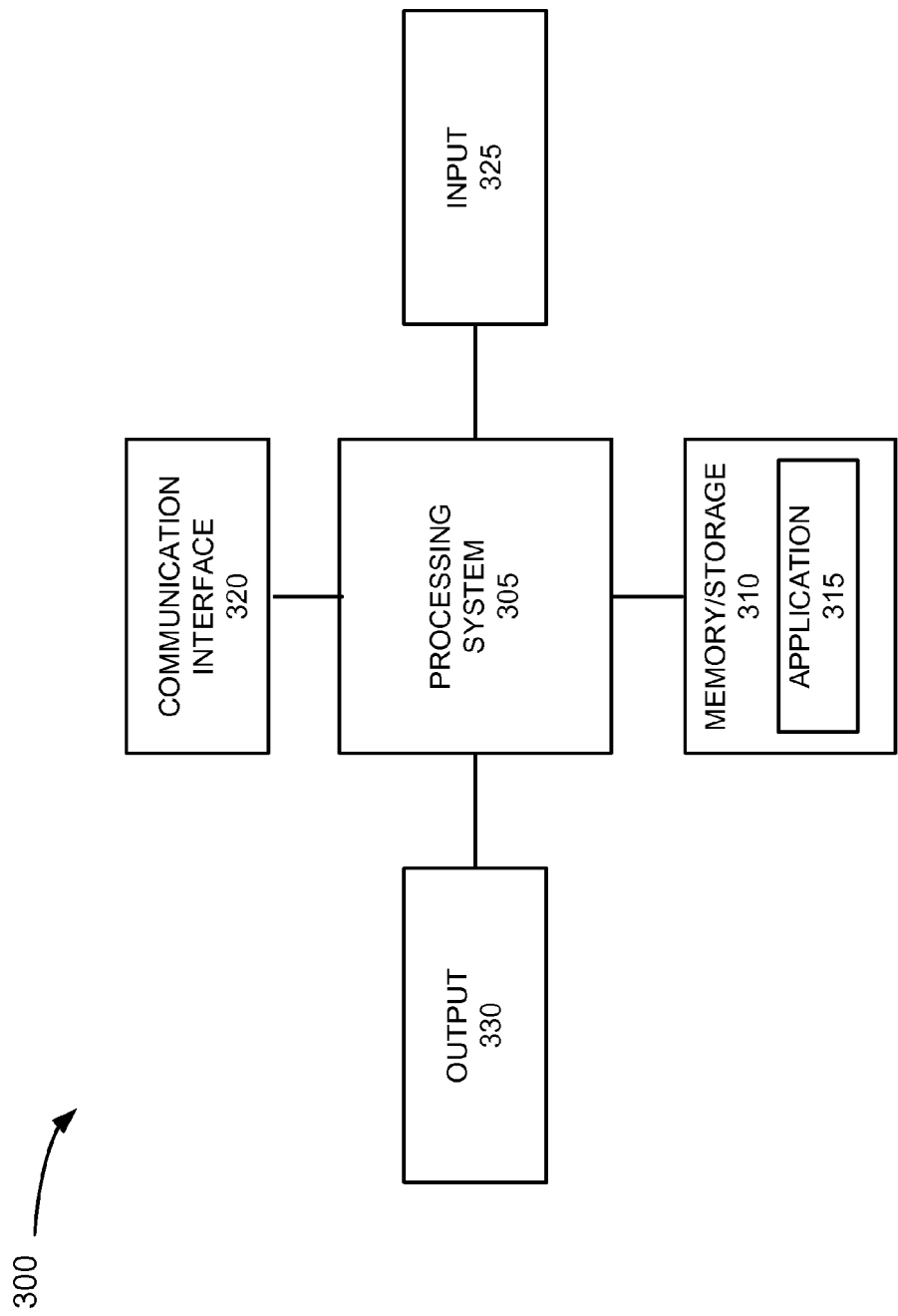
FIG. 3 is a diagram illustrating exemplary components of an exemplary embodiment of one or more devices illustrated in FIG. 2.

FIG. 3 is a diagram illustrating exemplary components of a device 300 that may correspond to one or more of the devices in network 100. For example, device 300 may correspond to one or more devices pertaining to DDC 150, such as, databases 210, order management system 220, data and security system 230, DDC service operation management system 240, DDC resource management system 250, DDC work order execution system 270, and DDC support system 290, as well as correspond to one or more devices pertaining to content creator 110, advertiser 120, digital media retailer 130, and/or consumer 140.

As illustrated, according to an exemplary embodiment, device 300 may include a processing system 305, memory/storage 310 including an application 315, a communication interface 320, an input 325, and an output 330. According to other embodiments, device 300 may include fewer components, additional components, different components, and/or a different arrangement of components than those illustrated in FIG. 3 and described herein.

Processing system 305 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component or logic that may interpret and/or execute instructions and/or data. Processing system 305 may control the overall operation or a portion of operation(s) performed by device 300. Processing system 305 may perform one or multiple operations based on an operating system and/or various applications (e.g., application 315). Processing system 305 may access instructions from memory/storage 310, from other components of device 300, and/or from a source external to device 300 (e.g., a network, another device, etc.).

Memory/storage 310 may include one or multiple memories and/or one or multiple other types of storage devices. For example, memory/storage 310 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 310 may include a hard disk (e.g., a magnetic disk, an optical disk, a magneto-optic disk, a solid state disk, etc.) or some other type of storing medium, along with a corresponding drive. Memory/storage 310 may be external to and/or removable from device 300, such as, for example, a Universal Serial Bus (USB) memory, a dongle, a hard disk, mass storage, off-line storage, etc.

The term "computer-readable medium," as used herein, is intended to be broadly interpreted to include, for example, a memory, a storage medium, a CD, a DVD, a Blu-ray disc, or another type of tangible storing medium. Memory/storage 310 may store data, application(s), and/or instructions related to the operation of device 300.

Application 315 may include software that provides various services and/or functions. For example, with reference to work flow command processor 272 and according to an exemplary embodiment, application 315 may include one or multiple applications for executing work flows, work units, etc., as described herein. Additionally, or alternatively, for example, with reference to other devices, components, etc., of DDC 150, applications 315 may include one or multiple applications for performing processes, functions, operations, etc., that are described herein.

Communication interface 320 may permit device 300 to communicate with other devices, networks, systems, etc., illustrated in network 100. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 330 may permit an output from device 300. For example, output 330 may include a speaker, a display, a light, an output port, and/or some other type of visual, auditory, tactile, etc., output component.

As described herein, device 300 may perform processes in response to processing system 305 executing software instructions (e.g., application 315) stored by memory/storage 310. By way of example, the software instructions may be read into memory/storage 310 from another memory/storage 310 or from another device via communication interface 320. The software instructions stored by memory/storage 310 may cause processing system 305 to perform one or more processes described herein. Alternatively, for example, according to other implementations, device 300 may perform one or more processes described herein based on the execution of hardware (processing system 305, etc.), the execution of hardware and firmware, or the execution of hardware, software, and firmware.

Referring to FIG. 2, as previous described, DDC 150 may include, among other devices, DDC work order execution system 270. Further, as previously described, according to an exemplary embodiment, DDC work order execution system 270 may include work flow command processor 272. A further description of work flow command processor 272 is provided below.

Work flow command processor 272 may execute work orders. For example, work flow command processor 272 may execute a work order based on resource allocations and work unit and work flow controls. Work flow command processor 272 may execute the work order as soon as the work order is received or based on a schedule. The execution of the work order may include content ingestion, transformation, and/or content distribution.

Figure 4:
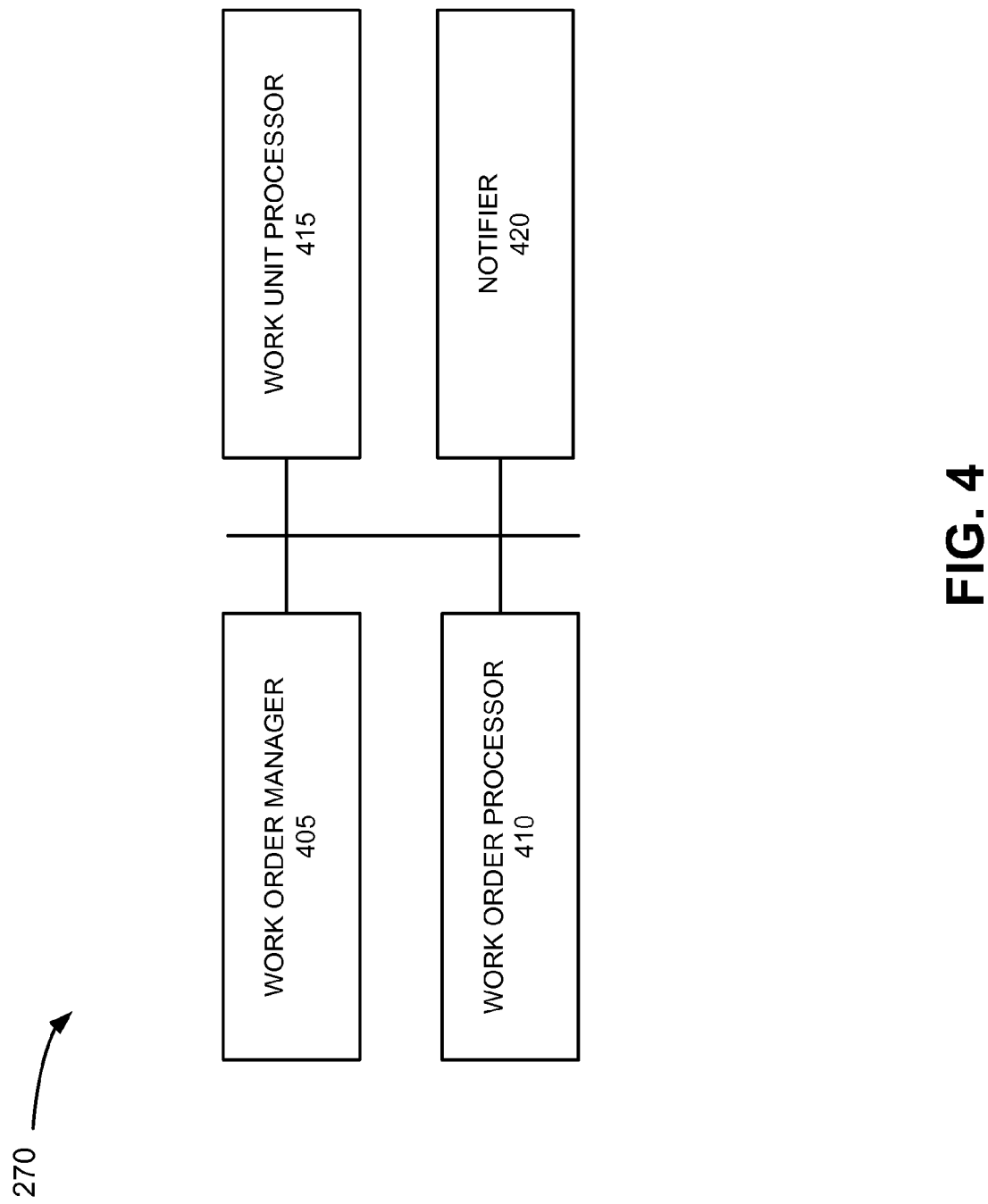
FIG. 4 is a diagram illustrating an exemplary embodiment of a DDC work order execution system illustrated in FIG. 2.

According to an exemplary embodiment, work flow command processor 272 may include the following components: a work order manager 405, a work order processor 410, a work unit processor 415, and a notifier 420, as illustrated in FIG. 4A.

Work order manager 405 may include various work order management functions, which pertain to the execution and/or management of a work order, work flow, work unit, etc., such as, for example, an initiating function, a status retrieving function, a suspending function, a resuming function, and a canceling function. Work order manager 405 may include interfaces to communicate with DDC resource management system 250 via (e.g., application programming interfaces (APIs), etc.), as well as other components of DDC 150.

Work order processor 410 may control a flow between work unit processes to fulfill the requirements associated with a work order. For example, the work order may include requirements that pertain to content ingestion, content transformation, and distribution of the content. Work order processor 410 may include interfaces to communicate with DDC resource management system 250 via (e.g., APIs, etc.), as well as other components of DDC 150. According to an exemplary embodiment, work order processor 410 may communicate with DDC resource management system 250, in real-time, for the allocation and de-allocation of resources that may be needed to successfully complete the work order based on the requirements of the work order.

Figure 5:
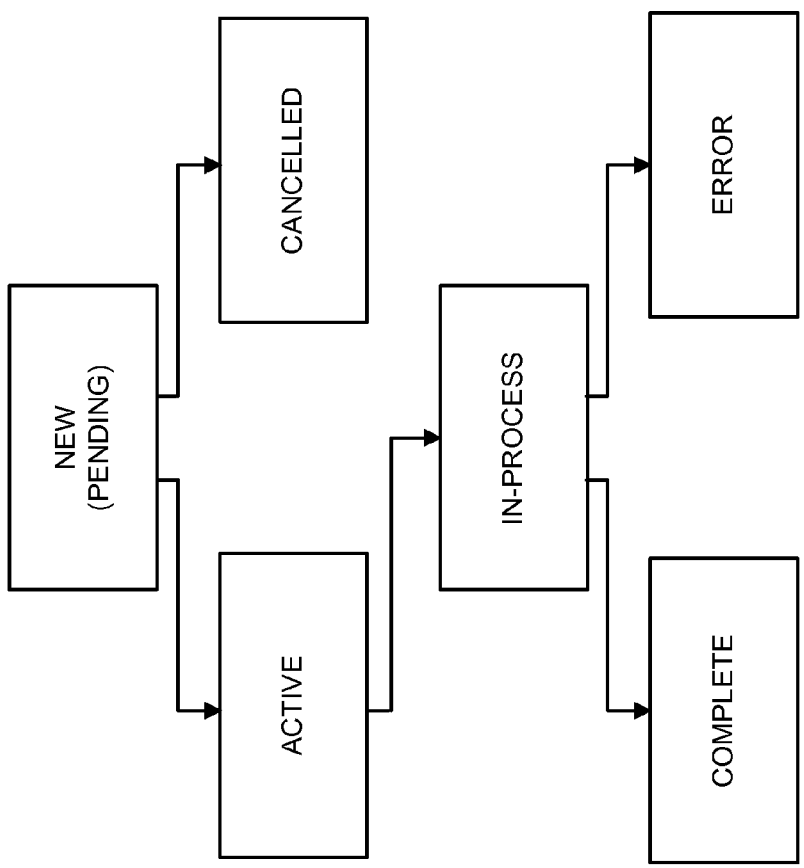
FIG. 5 is a diagram illustrating exemplary states associated with a work unit task connector.

Work order processor 410 may review and update states associated with a work unit task and work unit task connector parameters for each time unit of execution pertaining to the work unit. For example, referring to FIG. 5, a work unit task connector parameter state model may include a new state, an active state, a cancelled state, an in-process state, a complete state, and an error state. According to an exemplary embodiment, work order processor 410 may manage a state associated with work unit task connector parameters for each current time unit cycle of execution. For example, when a work order is received, work unit task connector parameters may be in a new state or a pending state. When a scheduled date and time for processing a work order occurs and resource allocations for the work order are verified (e.g., by work order scheduler 258 of DDC resource management system 250, etc.), work order processor 410 may update a state of the work unit task connector parameters to an active state. When a work unit starts, work order processor 410 may update the work unit task connector parameters that are in the active state to an in-process state. Once the work unit is completed, work order processor 410 may update the work unit task connector parameters that were in the in-process state to an end-status, such as, a complete state or an error state. According to an exemplary embodiment, the work unit task connector parameters may also include parameters pertaining to input connector points, output connector points, as described further below (e.g., FIG. 7B, and elsewhere in this description), and connectors, as described further below (e.g., FIG. 7C, and elsewhere in this description).

As previously described, work order processor 410 may control the flow between work unit processes to fulfill the requirements associated with a work order. For example, work order processor 410 may sequence work unit tasks in a manner that optimizes execution time and resource utilization. Work order processor 410 may communicate with DDC resource management system 250 (e.g., runtime resource manager 260) to allocate and de-allocate resources for processing the work order.

Work unit processor 415 may manage the execution of work unit tasks, for example, in terms of concurrency, priority, etc., in order to ingest, process, and/or distribute content. For example, work unit processor 415 may include the execution dispatch logic of each work unit that was previously developed (e.g., via a Websphere Process Server (WPS) or other type of device). Work unit processor 415 may manage the execution of work unit tasks using work unit adapters 274 and network elements 276.

Work unit processor 415 may use various techniques to optimize the processing of content. By way of example, work unit processor 415 may re-use previously processed content within a work order. For example, previously processed content may be available in a working storage area or in an archived storage area. In this way, work unit processor 415 may avoid unnecessary re-processing of content.

Additionally, work unit processor 415 may optimize the processing of work units that include repetitive operations. By way of example, work unit processor 415 may optimize encryption of content for more than one DMR 130 or may optimize pipelining and/or overlapping processing of content as much as possible per work flow definitions. Additionally, a work unit may self-evaluate its input and output requirements, and if the content has already been completed and is available, then the work unit may re-use the available content to satisfy its input and/or output requirements. Work unit processor 415 may also take into account work unit parallelism and work unit pipelining of content to compress the overall work flow execution time.

Work unit processor 415 may process work units based on various work flow types, such as, for example, an overlapped pipeline work flow, a locked sequence work flow, and a staggered (e.g., based on dates of quantity, type, time, etc.) work flow. In the event of work flow fall-out (e.g., error, overload, etc.), work unit processor 415 may route the work flow to the appropriate user group (e.g., by account).

According to an exemplary embodiment, the execution of a work unit may include a human task. According to such an embodiment, work unit processor 415 may dispatch the process to the appropriate functional user group that may perform a function (e.g., review, approve, respond to an error (e.g., resolve, retry, abort, etc.), or some other type of manual intervention, etc.) required by the work unit. A user may use any available resources that are functionally capable of completing the human task. According to an exemplary embodiment, a user group may be mapped to a resource type that provides for completion of a human task associated with a work unit.

Notifier 420 may receive and manage notification events from all processes within DDC 150. A notification event may be informational or require a response (e.g., a resolution action, etc.). According to an exemplary embodiment, notifier 420 may route a notification event to the appropriate user group.

Figure 6A:
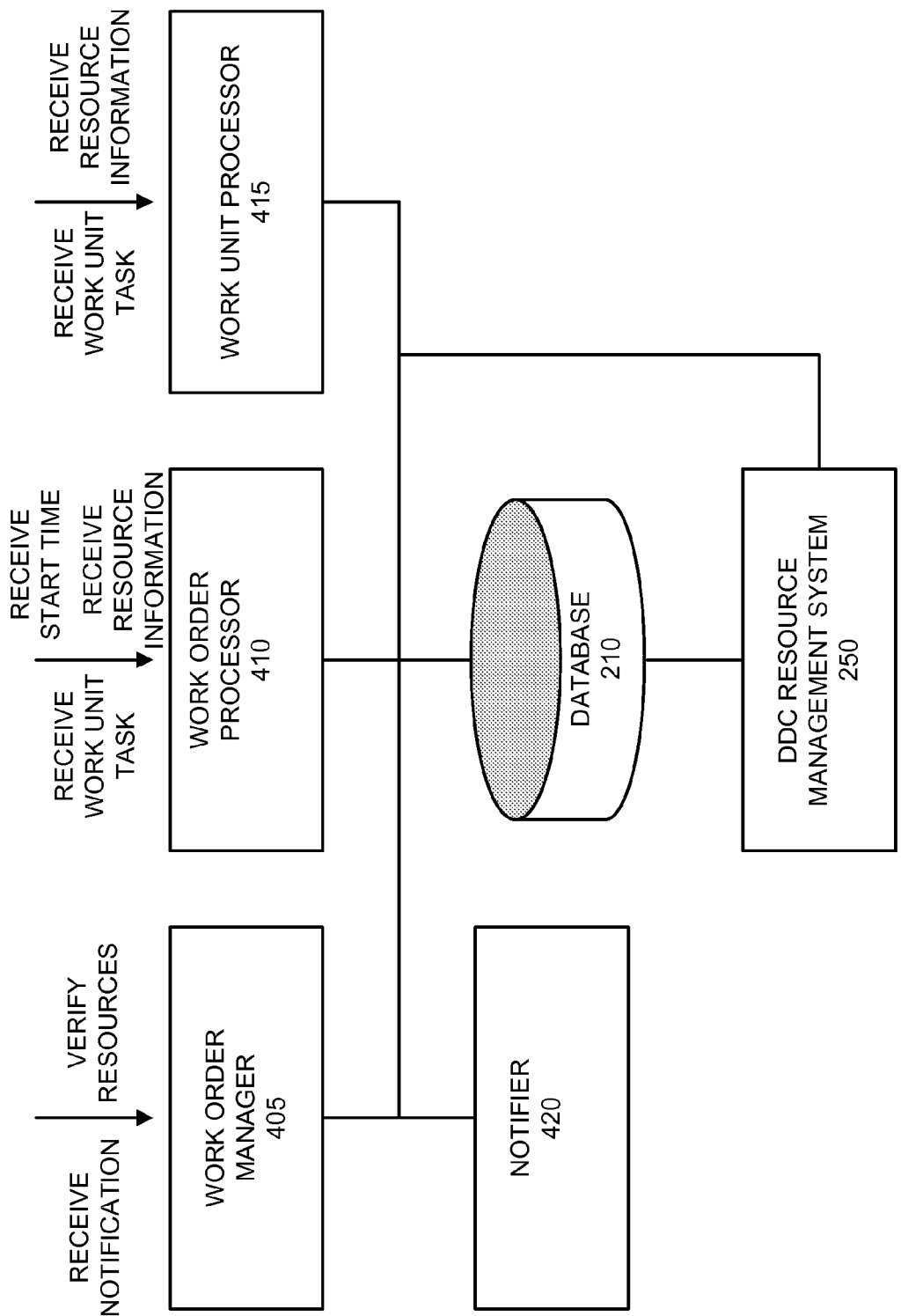
FIGS. 6A and 6B are diagrams illustrating an exemplary process for executing a work unit task associated with a work order.
Figure 6B:
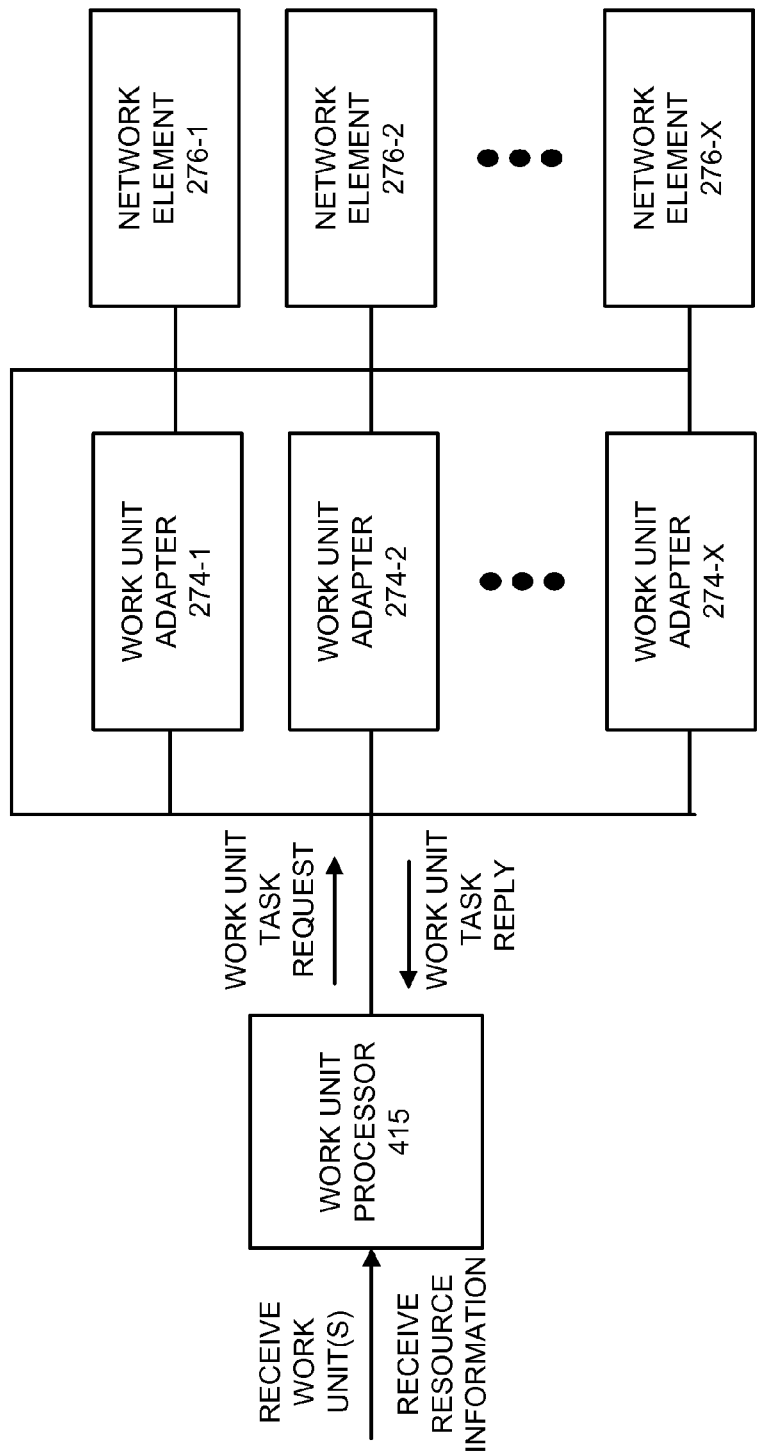

FIGS. 6A and 6B are diagrams illustrating an exemplary process for executing one or more work unit tasks associated with a work order by DDC work order execution system 270. The process is described with reference to various messages, interaction between devices, components, etc., of DDC 150, in particular DDC work order execution system 270, and with reference to operations performed by the devices, components, etc., illustrated. These messages, interactions, and operations are exemplary. According to other embodiments, the process may include additional messaging, different messaging, etc., additional interaction, different interaction, etc., and/or additional operations, different operations, etc., than those illustrated and described.

Referring to FIG. 6A, according to an exemplary embodiment, work order manager 405 may receive a notification that a work order is to be executed. The notification may include, for example, a work order identifier and an indication to begin the process for executing a work unit task associated with the work order. Based on the notification, work order manager 405 may verify the availability of the resources associated with the work order with DDC resource management system 250. In this example, it will be assumed that the resources for executing the work unit task(s) are verified.

According to an exemplary embodiment, work order manager 405 may send a request to work order processor 410. The request may include, for example, the work order identifier and a request to begin processing the work order. Based on the request, work order processor 410 may select a work unit task. By way of example, a work flow may include multiple work unit tasks that have a particular order of execution. Work order processor 410 may select the appropriate work unit task based on a work unit task sequence corresponding to the work flow. Additionally, for example, work order processor 410 may receive a start time of execution for the work unit task. Further, as illustrated in FIG. 6A, work order processor 410 may receive resource information pertaining to the execution of the work unit task. For example, work order processor 410 may communicate with DDC resource management system 250.

According to an exemplary embodiment, at the appropriate start time, work order processor 410 may provide work unit task information (e.g., work unit definitions, work unit task connector parameters, work order parameters (e.g., start time, quantity, etc.), human intervention parameters, error handling parameters, accounting parameters, storing parameters (e.g., archiving, etc.), and resource information to work unit processor 415. Work unit processor 415 may use this information to execute the work unit task. Work unit processor 415 may also use other types of parameters, such as, for example, system parameters (e.g., retry parameters, timeout parameters, default parameters, etc.), which may be global, configurable, etc.

Referring to FIG. 6B, according to an exemplary embodiment, based on the work unit task information and/or resource information, work unit processor 415 may select a work unit adapter 274 to assist in executing the work unit task. Work unit processor 415 may send a work unit task request to work unit adapter 274. The work unit task request may include, for example, work unit definitions and other parameters necessary to execute the work unit task. According to an exemplary embodiment, work unit adapter 274 may translate the work unit definitions and other parameters to a format which network element 276 understands and is able to use. For example, network element 276 may correspond to a third party application that may run on a platform different from DDC 150. Upon translation, work unit adapter 274 may select the appropriate network element 276 to carry out the execution of the work unit task. When network element 276 receives the translated work unit definitions and other parameters, network element 276 may execute the work unit task. According to an exemplary embodiment, work unit processor 415 may monitor the execution of the work unit task. For example, work unit processor 415 may make one or more calls (e.g., a synchronous call or an asynchronous call) to work unit adapter 274 to determine a status of the execution. In response to a call, work unit adapter 274 may communicate with network element 276 (e.g., using polling, using synchronous communication, using asynchronous communication, etc.). Work unit adapter 274 may then provide a response to work unit processor 415. According to an exemplary embodiment, work unit processor 415 may monitor the status of the execution based on a state parameter associated with work unit task connector parameters of a work unit task. For example, work unit processor 415 may determine when the execution of a work unit task is completed based on a response to a call that indicates the state parameter is in a complete state. According to another embodiment, as described below, network element 276 may send a work unit task reply (e.g., in response to a call or not in response to a call).

According to an exemplary embodiment, upon completion of the execution of the work unit task, network element 276 may send a work unit task reply to work unit processor 415 (e.g., via work unit adapter 274) that indicates the work unit task is complete. The work unit task reply may include a pointer or memory/storage identifier that indicates the location of the processed content. For example, the processed content may be stored by a common memory/storage (e.g., databases 210).

With reference to FIGS. 6A and 6BA, although the exemplary process is described without mention of notifier 420, according to an exemplary embodiment, notifier 420 may receive and manage notification events during the execution of the work unit task. For example, if an error occurs, notifier 420 may receive an error message. Notifier 420 may route the error message to the appropriate user group.

Figure 7A:
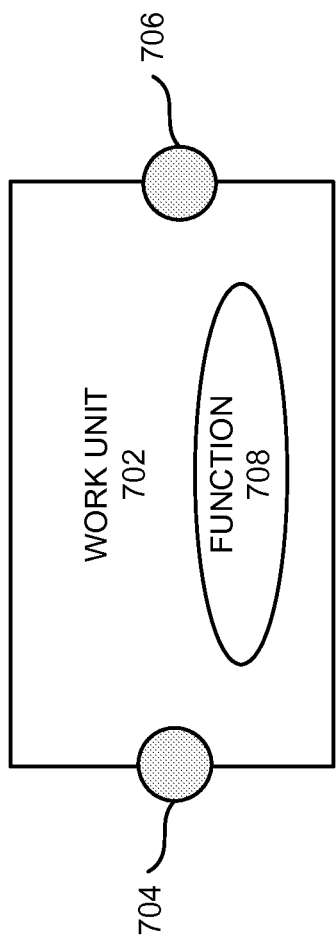
FIG. 7A is a diagram illustrating an exemplary embodiment of a work unit.

FIG. 7A is a diagram illustrating an exemplary embodiment of a work unit 702. As illustrated, work unit 702 may include an input connector point 704 (or an input port 704), an output connector point 706 (or an output port 706), and a function 708. According to other exemplary embodiments, work unit 702 may include additional elements, fewer, and/or different elements than those illustrated and described with respect to FIG. 7A.

Input connector point 704 may allow an input (e.g., content) to be received by work unit 702. Input connector point 704 may include a connector type. For example, a connector type may correspond to a type of content (e.g., metadata, image, video, etc.). The connector type and/or the number of input connector points 704 may depend on function 708.

Output connector point 706 may allow an output (e.g., content) to be output by work unit 702. Output connector point 706 may include a connector type. For example, a connector type may correspond to a type of content (e.g., metadata, image, video, etc.). The connector type and/or the number of input connector points 706 may depend on function 708.

Function 708 may correspond to one or more work unit tasks that may be performed by work unit 702 based on the input received via input connector point 704, various parameters that function 708 may use to carry-out the one or more work unit tasks, and the expected output via output connector point 706. A further description of work unit 702 is provided below.

Figure 7B:
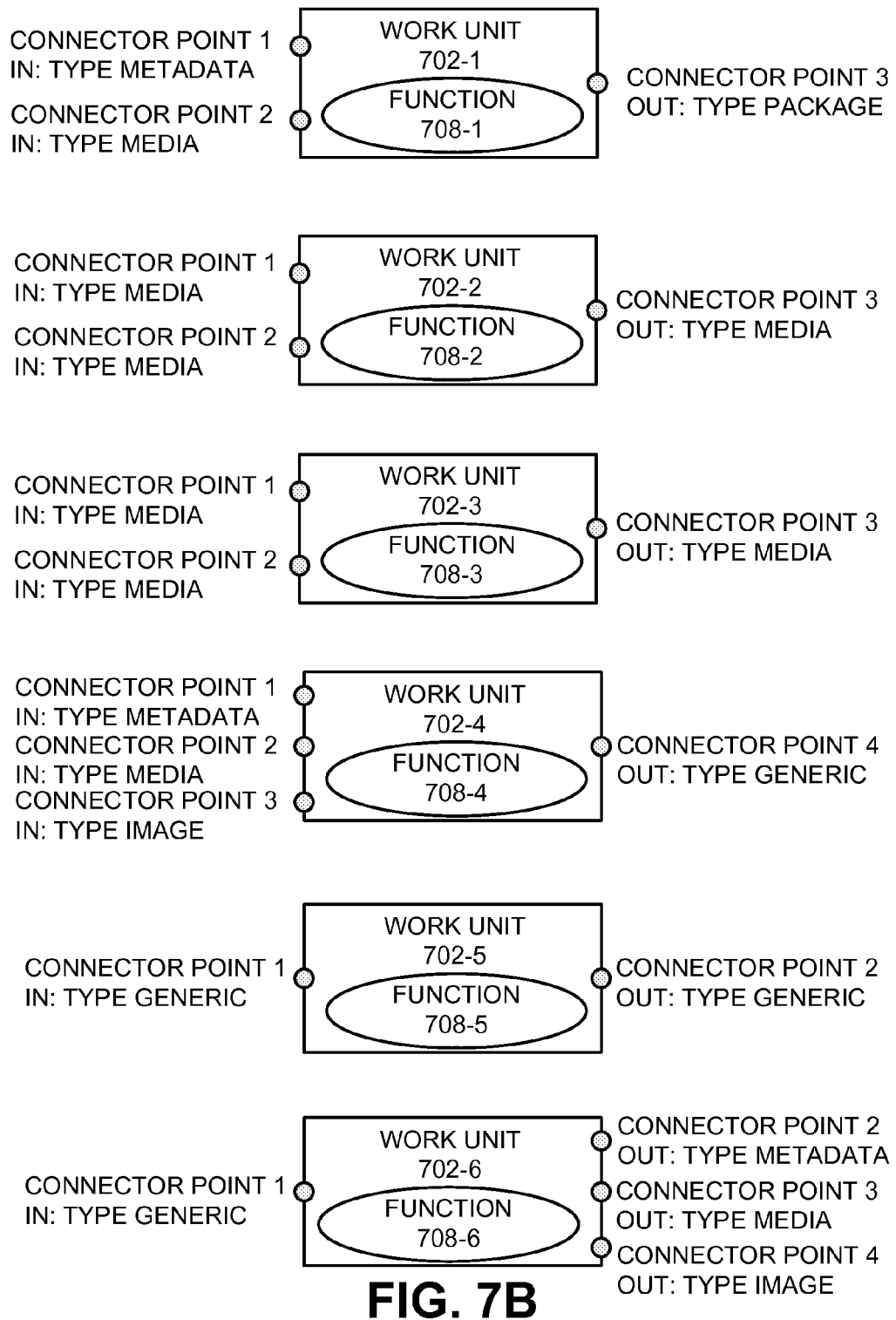
FIG. 7B is a diagram illustrating exemplary embodiments of different types of work units.

FIG. 7B is a diagram illustrating exemplary embodiments of different types of work units. As illustrated, work units 702-1 through 702-6 may include, among other things, a different number of input connector points 704, a different number of output connector points 706, different types of input connector points 704, different types of output connector points 706, and different functions 708. In this regard, work units 702 may differ in function and connection point requirements.

Referring to work unit 702-1, input connector point 1 may be configured to receive metadata, input connector point 2 may be configured to receive media, and function 708-1 may be configured to structurally change inbound types (e.g., metadata and media) to a new outbound type (e.g., a package). For example, a package may refer to media content (e.g., video, audio, multimedia, etc.) and additional data (e.g., metadata). Work unit 702-1 may receive the metadata and the media content as input and may output a package by combining the metadata and the media content.

Referring to work unit 702-2, input connector point 1 may be configured to receive media, input connector point 2 may be configured to receive media, and function 708-2 may be configured to merge the media. For example, the media received via input connector points 1 and 2 may be of the same type (e.g., media streams) and used to generate a new media (e.g., a new media stream). According to an exemplary implementation, work unit 702-2 may merge the media based on a round-robin approach or some other type of input connector point sequence.

Referring to work unit 702-3, input connector point 1 may be configured to receive media, input connector point 2 may be configured to receive media, and function 708-3 may be configured to combine the media. For example, the media received via input connector points 1 and 2 may be of a different type and used to generate a new media.

Referring to work unit 702-4, input connector point 1 may be configured to receive metadata, input connector point 2 may be configured to receive media, input connector point 3 may be configured to receive an image, and function 708-4 may be configured to merge the inputs received. Since the output of work unit 702-4 can vary depending on its inputs, output connector point 706 is of a generic type (e.g., the output may be of any type).

Referring to work unit 702-5, input connector point 1 may be of the generic type and may be configured to receive any type of content, function 708-5 may perform one or more work unit tasks, and output connector point 2 may be of a generic type that outputs content. By way of example, function 702-5 may duplicate the content and concatenate the duplicate content with the original content.

Referring to work unit 702-6, input connector point 1 may be of the generic type and may be configured to receive any type of content, function 708-5 may perform a sort, output connector point 2 may be configured to output metadata, output connector point 3 may be configured to output media, and output connector point 4 may be configured to output an image. For example, function 702-6 may sort any type of content as metadata, media, and image.

According to other exemplary embodiments, work unit 702 may correspond to other types of work units. By way of example, work unit 702 may include other types of input connection points or other types of output connection points. Additionally, as previously described, the work unit task connector parameters may include parameters to indicate the type of content (e.g., media, metadata, generic, image, etc.) pertaining to a connection point of a work unit. In turn, connector points may be matched (e.g., type of content, etc.) with connectors. Connectors are described further below in FIG. 7C and elsewhere in this description.

Additionally, or alternatively, work unit 702 may include other types of functions. For example, work unit 702 may include an error connection point that may communicate with an error handling work unit. According to such an embodiment, error handling work unit parameters may be used to define criteria for handling an error. For example, the parameters may include error logging parameters, notification to user parameters, human intervention parameters, work flow parameters (e.g., stopping work flow, suspending work flow, etc.), labeling error (e.g., severe, etc.). Additionally, or alternatively, work unit 702 may include other types of content-specific connection points (e.g., video, audio, etc.), processed content connection points (e.g., compressed video connection point, etc.), format-specific content (e.g., high-definition video, etc.), etc. Additionally, or alternatively, work unit 702 may include only an input connection point or only an output connection point. According to such embodiment(s), work unit task connector parameters may include parameters corresponding to specific types of errors, other types of content, etc.

Additionally, or alternatively, functions 708 may correspond to other types of processes. By way of example, work unit 702 may include functions, such as, for example, create metadata, transform metadata (e.g., converting metadata format, etc.), pull metadata (e.g., obtain, retrieve, receive, etc., metadata from a source (e.g., a content provider, such as content creator 110, advertiser 120, etc.), pull content (e.g., obtain, retrieve, receive, etc., content from a source), confirm delivery (e.g., with respect to content), split content, distribute (e.g., distribute content to a DMR, etc.), encrypt, decrypt, encode, decode, close captioning (e.g., overlay a transcript of audio, etc.), branch (e.g., send copies of metadata to multiple work units, etc.), ad marker (e.g., insert advertisements in content, etc.), archive, save, retrieve, quality assurance (e.g., check a quality of the processed content, etc.), manual intervention (e.g., assign work to human workers, etc.), report (e.g., send different types of reports to users, etc.), transcode (e.g., content), assemble (e.g., assemble data for generating a work order), inserting logos or black space into the content, etc.

Figure 7C:
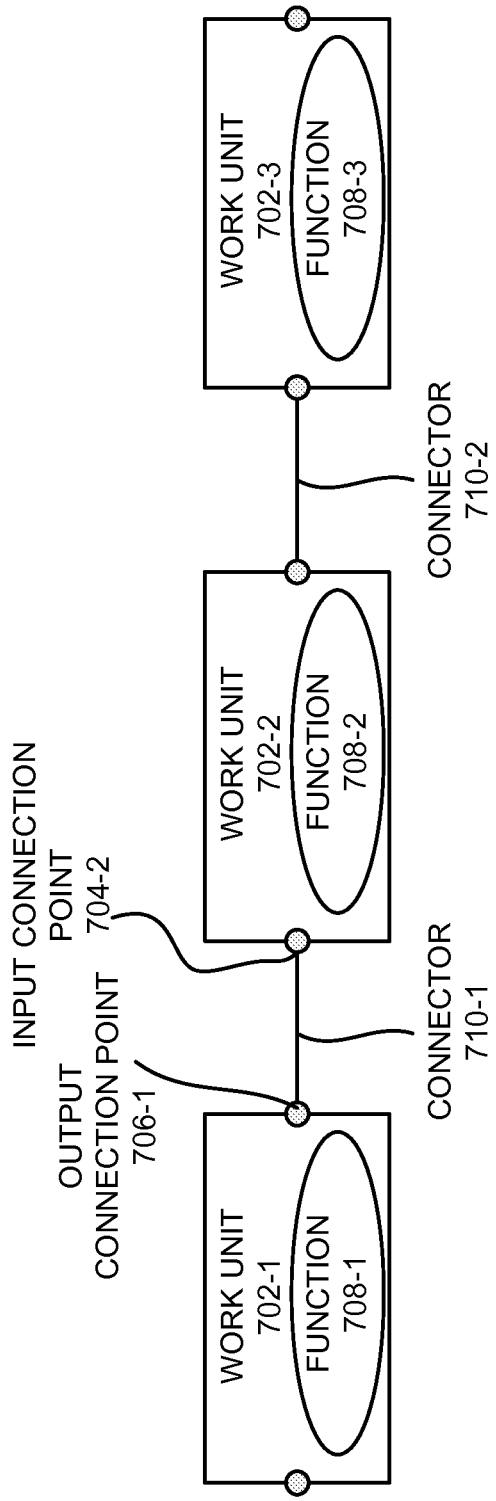
FIG. 7C is a diagram illustrating a series of work units.

FIG. 7C is a diagram illustrating a series of work units 702. According to an exemplary embodiment, work units 702 may be connected to each other based on connectors 710. For example, as illustrated in FIG. 7C, connector 710-1 may connect work units 702-1 and 702-2, and connector 710-2 may connect work units 702-2 and 702-3. According to an exemplary embodiment, connector 710 may correspond to particular type (e.g., similar to input connection point 704, output connection point 706). For example, connector 710-1 may be of the same type as output connection point 706-1 and input connection point 704-2. Additionally, according to an exemplary embodiment, connector 710 may also include connector criteria that controls whether or not connector 710 is active. The connector criteria may permit or prevent data to flow from one work unit 702 to another work unit 702, to flow from one connection point to another connection point, etc.

Connector 710 may facilitate the transfer of data (e.g., content, parameters, etc.) between work units 702. Connector 710 may also communicate with databases 210 to obtain data. According to an exemplary embodiment, a sending work unit (e.g., work unit 702-1) may provide connector 710-1 with data, and a receiving work unit (e.g., work unit 702-2) may receive the data. For example, the receiving work unit may receive the data based on processes associated with DDC work order execution system 270 (e.g., work unit processor 415).

According to an exemplary embodiment, databases 210 may include storing work unit definitions. For example, DDC service operation management system 240 may permit a user to create a work unit, create work unit parameters as well as other data that may define the work unit. As previously described, DDC work order execution system 270 may receive work unit tasks from databases 210. A further description of a work unit definition is provided below.

Figure 7D:
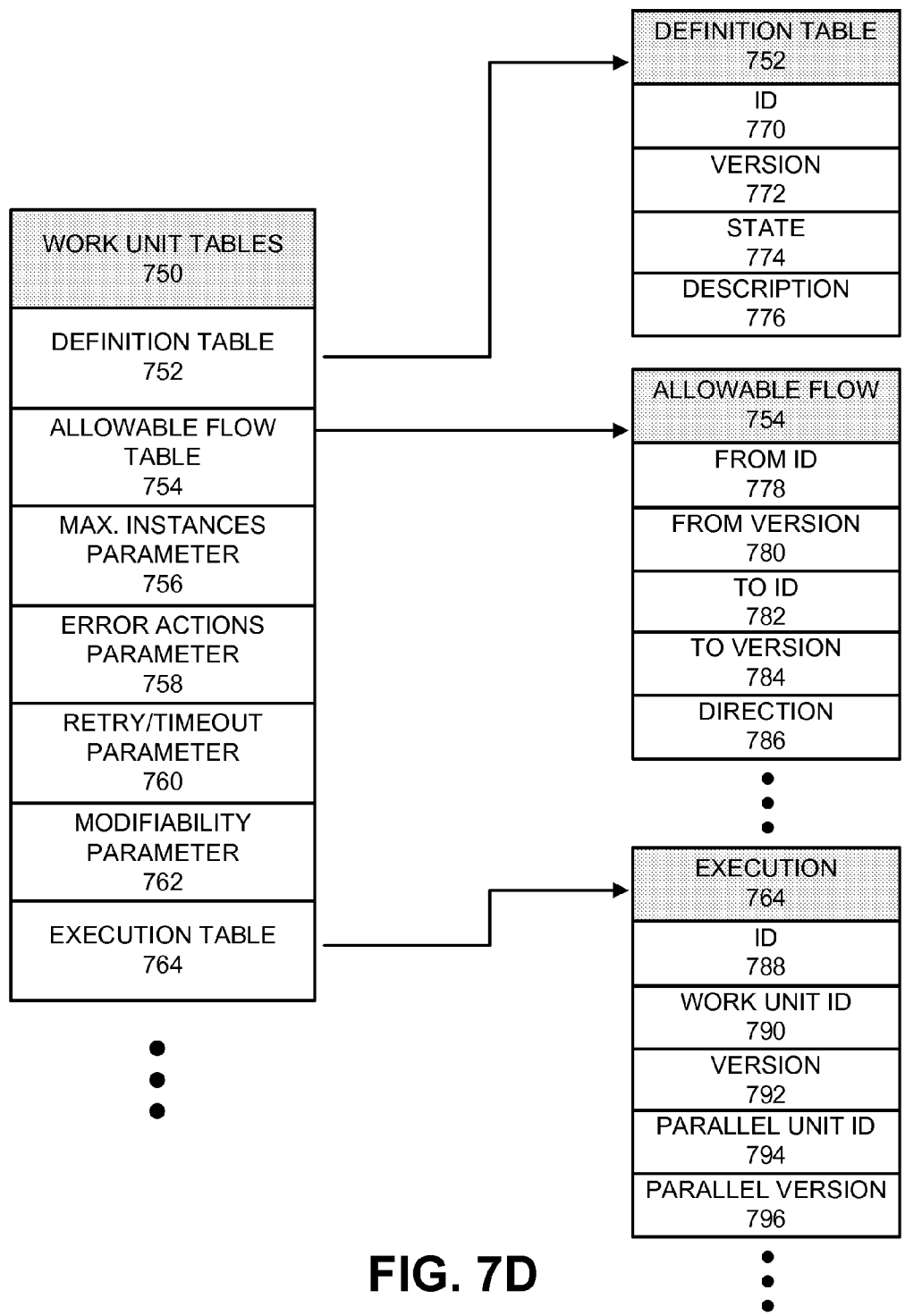
FIG. 7D is a diagram illustrating exemplary tables and parameters that may be related to a work unit.

FIG. 7D is a diagram illustrating exemplary tables and parameters that may be related to a work unit. When a work unit or other related components (e.g., a work flow, a connector, a work order, etc.) are created, DDC service operation management system 240 may update or generate such tables and parameters, in databases 210 or in memory/storage 310, that characterize and track the work unit and the other components. The diagram in FIG. 7D illustrates the relationship between the tables, as well as parameters that pertain to the work unit.

As illustrated, work unit tables 750 may include a work unit definition table 752, an allowable flow table 754, maximum instances parameter 756, error actions parameter 758, retry/timeout parameter 760, modifiability parameter 762, and execution table 764. Although DDC 150 may include other work unit-related tables or parameters, for simplicity, they are not illustrated in FIG. 7D. Additionally, according to other embodiments, DDC 150 may include additional, fewer, different, or differently arranged tables than those illustrated in FIG. 7D. For example, according to an exemplary embodiment, work unit definition table 752 may include information included in allowable flow table 754.

Definition table 752 may include a work unit ID 770, a work unit version number 772, a work unit state 774, and a description 776. Work unit ID 770 may identify a work unit. Work unit version number 772 may identify a version of the work unit. For example, work unit ID 770 and version number 772 may be generated and/or assigned to a work unit when the work unit is created. A work unit may be assigned a new work unit version number 772 when, for example, the work unit is updated. In such instances, work unit ID 770 may remain the same. Work unit state 774 may indicate a current state of the work unit (e.g., "new," "active," "inactive," "testing," "tested," etc.).

According to an exemplary embodiment, work unit ID 770 and version number 772 may be used to associate a work unit with a work flow. In this way, when a work unit is updated and ready to be used (e.g., passed testing, etc.), work unit state 774 may be updated to "active," which may automatically cause work unit state 774 of the older version work unit to become "inactive." In this way, the updated work unit may be automatically used in work flows (e.g., future work flow executions) in which the older version work unit was included. Description 776 may include a description (e.g., in text) pertaining to the functionality of the work unit.

Allowable flow table 754 may indicate whether work units may be interconnected, and may include a From ID 778, a From version 780, a To ID 782, a To version 784, and a direction 786. From ID 778 and From version 780 may indicate a work unit ID and a version of one of the work units. To ID 782 and To version 784 may indicate a work unit ID and a version of another one of the work units. Direction 786 may indicate a direction in which data is to flow between the work units (e.g., forward, reverse, etc.). Allowable flow table 754 may also specify a work unit's allowed relationships with other work units. By way of example, allowable flow table 754 may specify which work units may be allowed before it and which work units may be allowed after it.

Execution table 764 may include runtime information used for execution of a work unit. During an execution of logic (e.g., program, scripts, etc.) associated with a work unit, DDC 150 may create an instance of execution table 764 corresponding to the work unit, to control and/or track the progress of the execution. Accordingly, execution table 764 may include a work unit execution ID 788, work unit ID 790, work unit version 792, parallel unit ID 794, and parallel version 796. For simplicity, other entries in work execution table 1014 are not illustrated (e.g., additional parallel IDs and parallel versions).

Work execution ID 788 may identify a process (e.g., a runtime instance of a program or a script) or thread associated with the work unit. Work unit ID 790 and work unit version 792 may identify the work unit and the work unit version associated with the process, script, thread, etc. Parallel unit ID 794 and parallel version 796 may identify a version of the work unit that may be executed in parallel with the work unit identified by fields 790 and 792. In other words, it may be specified which work unit(s) may be executed in parallel with another work unit.

Figure 7E:
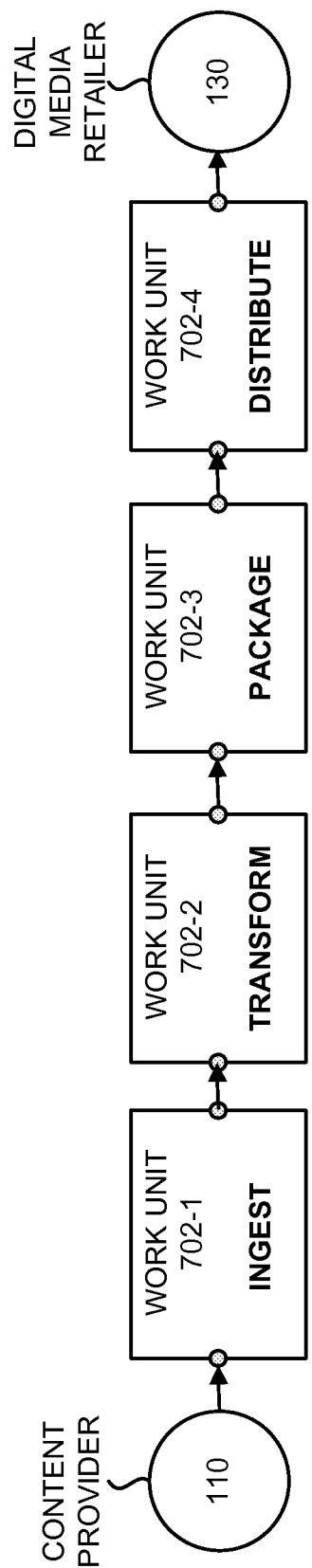
FIG. 7E is a diagram illustrating an exemplary embodiment of a work flow diagram.

FIG. 7E is a diagram illustrates an exemplary embodiment of a work flow diagram. According to an exemplary embodiment, DDC 150 may display work flow diagrams at a GUI client via DDC service operation management system 240. For example, a DDC operator may edit and/or save such work flow diagrams. As illustrated in FIG. 7E, the work flow diagram may include a content creator/provider 110, work units 702-1 through 702-4, and a DMR 130. In this example, work unit 702-1 may include an ingest function, work unit 702-2 may include a transform function, work unit 702-3 may include a package function, and work unit 702-4 may include a distribute function. Other work flow diagrams may include the same, additional, and/or different work units than those illustrated in FIG. 7E.

During execution of a work unit, a work flow, etc., DDC work order execution system 270 may use resources allocated by DDC resource management system 250. For example, when a work order is processed by DDC resource management system 250, work order estimator 254 may estimate the number of RCUs needed to execute the work order within a work flow. Work order estimator 254 may consider, among other things, content type, functions (e.g., work units) needed to process the content, number of copies requested, cost factors, time factors, etc. As an example, a content type may correspond to a movie, which is CableLabs compliant, approximately 2 hours in length, 4 gigabytes in size, and of an MPEG-2 format. According to other examples, the content type may include additional or fewer parameters. For example, a content type may correspond to one or more of the following parameters, such as, content (e.g., audio, video, image, metadata, etc.), file type (e.g., a windows media video (WMV) file, audio video interleave (AVI) file, Joint Photograph Experts Group (JPEG) file, etc.), compliance (e.g., CableLabs, etc.), other characteristics associated with the content (e.g., length, size, etc.), etc.

Work order scheduler 258 may schedule the execution of a work order. After a work order is scheduled, runtime resource manager 260 may communicate with DDC work order execution system 270 to facilitate execution of the work order. For example, runtime resource manager 260 may allocate network elements 276 and user groups at the time of execution. According to an exemplary embodiment, runtime resource manager 260 may determine if the resources that were calculated (e.g., by work order estimator 254) and planned to be used (e.g., by work order scheduler 258) are currently available. In the event that the resources are not available, runtime resource manager 260 may check the current capacity associated with network elements 276 and user groups. Runtime resource manager 260 may allocate alternate resources when they are not available.

Figure 8A:
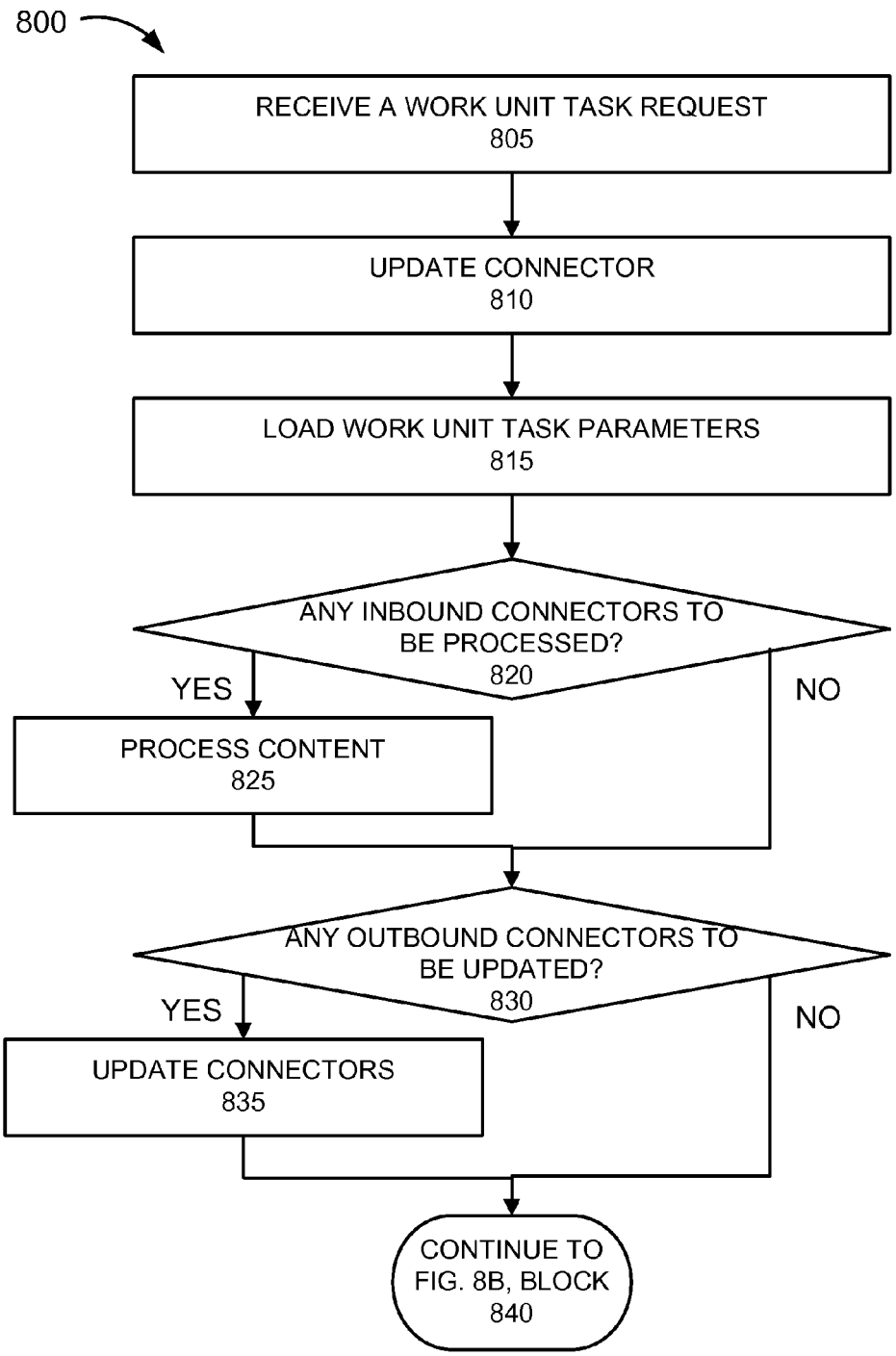
FIGS. 8A and 8B are flow diagrams illustrating an exemplary process for processing a work unit task by a DDC work order execution system.
Figure 8B:
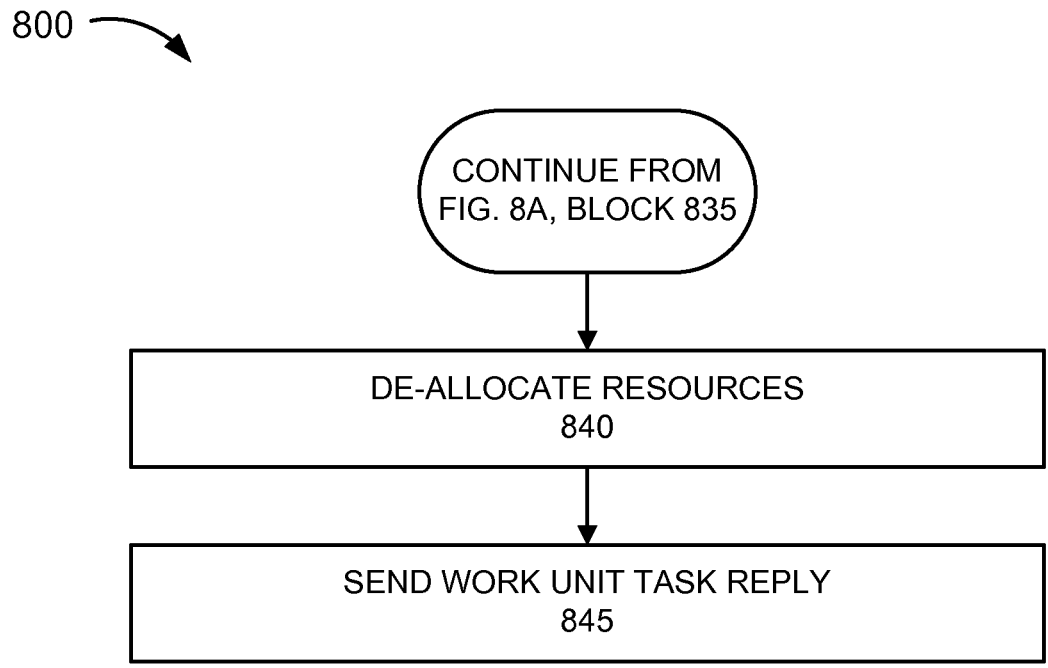

FIGS. 8A and 8B illustrate a flow diagram of an exemplary process 800 for processing a work unit task by DDC work order execution system 270. For example, process 800 may be performed by work unit processor 415.

Process 800 may begin with receiving a work unit task (805). For example, work unit processor 415 may receive a request to execute a work unit task. The request may cause work unit processor 415 to begin an execution process.

Connectors may be updated (block 810). For example, work unit processor 415 may update the state of connectors associated with a work flow, a work unit, and/or a work unit task. For example, work unit processor 415 may update connector state information in databases 210. The connector state information may correspond to, for example, an active state, an inactive state, an in-progress state, etc.

Work unit task parameters may be loaded (block 815). For example, work unit processor 415 may receive work unit task information for executing a work unit task. As an example, the work unit task information may include input connector point information, output connector point information, the content, and/or other parameters necessary for the execution of the work unit task.

It may be determined whether any inbound connectors need to be processed (block 820). For example, based on the work unit task parameters, work unit processor 415 may determine whether any input connector points associated with a work unit task may need to be executed or processed. If it is determined that there is an inbound connector to be processed (block 820—YES), the content associated with the inbound connectors may be processed (block 825). For example, work unit processor 415 may cause the input connector point associated with the work unit task to be executed or processed by network element 276. In other words, the content may be processed based on the input connector point and work unit task information. According to an exemplary embodiment, work unit processor 415 may select the appropriate work unit adapter 274 and/or network element 276 based on the resource information and/or work unit task information. According to another exemplary embodiment, work unit processor 415 may not use work unit adapter 274 (e.g., depending on the work unit task being executed).

If it is determined that there is not an inbound connector to be processed (block 820—NO), it may be determined whether any outbound connectors need to be updated (block 830). For example, work unit processor 415 may determine whether any outbound connectors need to be updated based on communication with network element 276. If it is determined that there is an outbound connector to be updated (block 830—YES), then the updates may be stored (block 835). For example, work unit processor 415 may update databases 210 with connector information (e.g., status, other details pertaining to a connector, content processed, etc.).

If it is determined that there is not an outbound connector to be updated (block 830—NO), resources may be de-allocated (block 840), as illustrated in FIG. 8B. For example, work unit processor 415 may communicate to DDC resource management system 250, directly or via work order processor 410 and/or work order manager 405, to de-allocate the resources Process 800 may include sending a work unit task reply (block 845). For example, work unit processor 415 may send a work unit task reply to work order processor 410 and/or work order manager 405. For example, the work unit task reply may include an indication that the work unit task is complete. The work unit task reply may include a work unit task identifier, an identifier or a pointer indicating where the output content is stored, etc.

Although FIGS. 8A and 8B illustrate exemplary operations for processing a work unit task, according to other exemplary embodiments, process 800 may include additional operations, fewer operations, and/or different operations than those illustrated and described. For example, process 800 may include error handling and management operations (e.g., if an error occurs when executing the work unit task) and/or other operations pertaining to the processing of a work unit, as described herein.

FIGS. 9A-9E illustrate a flow diagram of an exemplary process 900 for processing a work unit task by DDC work order execution system 270. For example, process 900 may be performed by work unit processor 415. According to an exemplary embodiment, a work unit task may include multiple work unit tasks that correspond to a sub-work flow or a micro-work flow. Process 900 may be performed one or multiple times (e.g., in a loop fashion) depending on the work unit task.

Figure 9A:
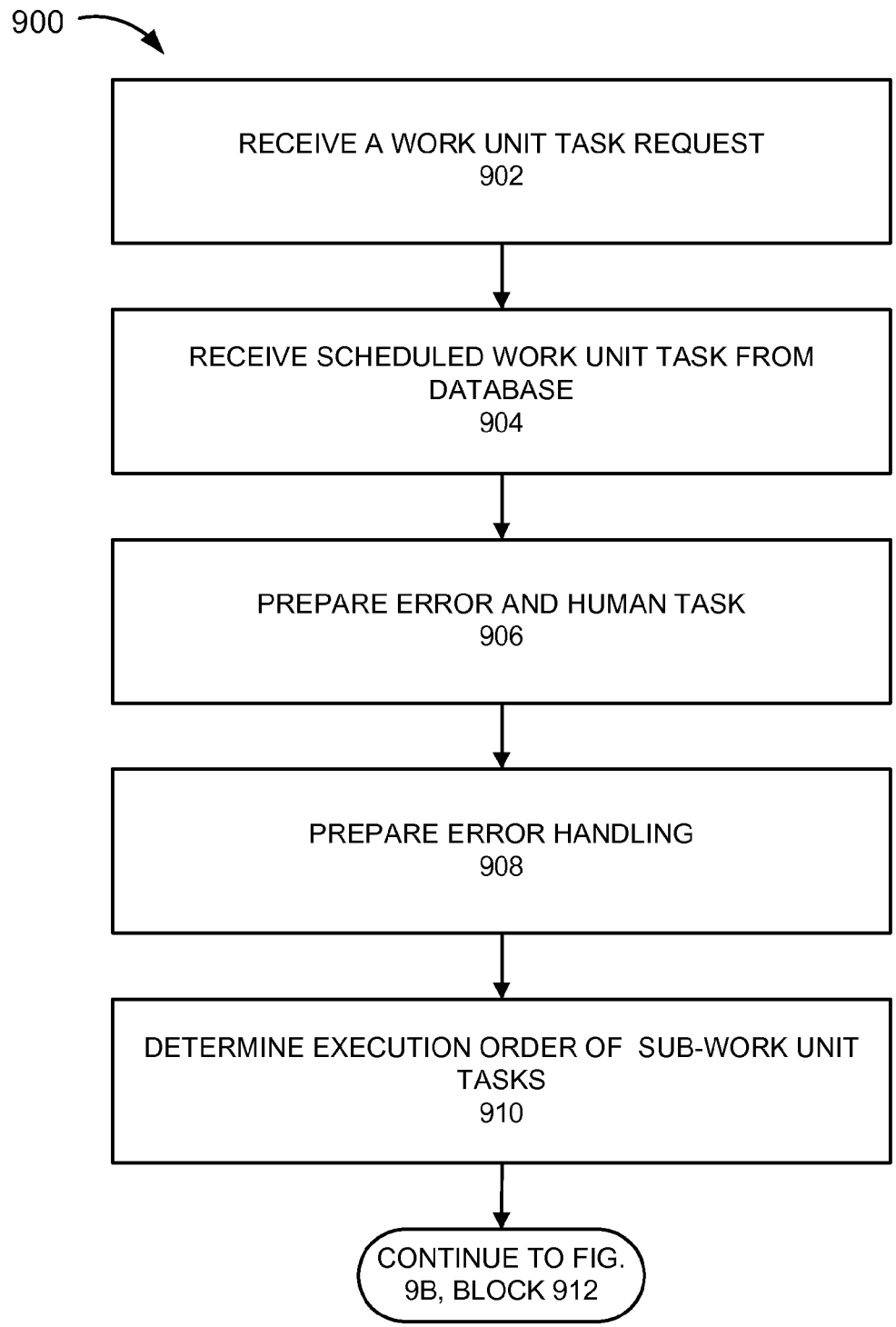
FIGS. 9A-9E are flow diagrams illustrating an exemplary process for processing a work unit task by a DDC work order execution system.

Referring to FIG. 9A, a work unit task request may be received (block 902). For example, work unit processor 415 may receive a work unit task request by, for example, work order processor 410. The work unit task request may cause work unit processor 415 to begin the execution of the work unit task. For example, the work unit task request may include a work order identifier, a work flow identifier, and/or a work unit identifier.

A schedule for the work unit task may be received from a database (block 904). For example, work unit processor 415 may receive a schedule for executing the work unit associated with a work order from databases 210.

Error and human tasks may be prepared for execution (block 906) and error handling may be prepared (block 908). For example, work unit processor 415 may process various system parameters that may pertain to error management and process human task details (e.g., in case of an error occurring). Work unit processor 415 may also communicate (e.g., notify, provide error parameters, and/or other information, etc.) with an error handling component of DDC 150 in the event that an error occurs during the execution of a work unit task, a sub-work unit task, etc.

An execution order for sub-work unit tasks may be determined (block 910). For example, work unit processor 415 may manage the execution order of the work unit task. For example, the work unit task may include multiple sub-work unit that may each have identifiers to allow work unit processor 415 to manage the execution order of the sub-work unit tasks (e.g., a micro-work flow, etc.), based on these identifiers. Work unit processor 415 may also manage the execution of the work unit task based on other information (e.g., optimization, statuses and states of other work unit tasks or sub-work unit tasks, dependencies, scheduling, etc.).

Figure 9B:
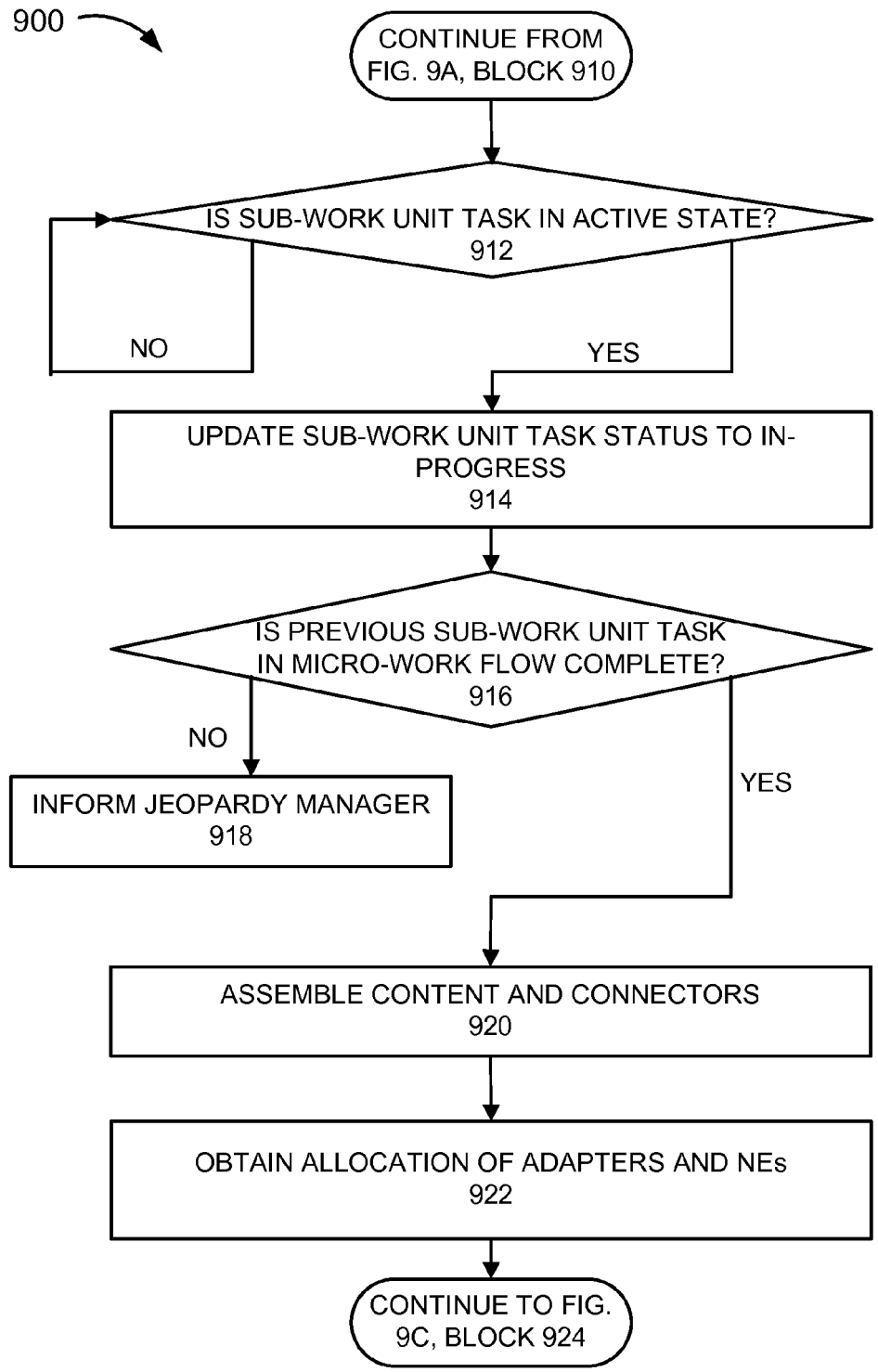

Referring to FIG. 9B, and with reference to each sub-work unit task, process 900 may include determining whether a sub-work unit task is in an active state (block 912). When a scheduled date and time for processing a work unit and/or a sub-work unit occurs and resource allocations for the work unit and/or the sub-work unit are verified, a sub-work unit task may be in an active state. If it is determined that a sub-work unit task is in an active state (block 912—YES), the status of the sub-work unit task may be updated to an in-progress state (block 914). For example, when the sub-work unit task is being executed (e.g., by network element 276), work unit processor 415 may update the status of the sub-work unit task to an in-progress state (e.g., in databases 210). For example, according to an exemplary embodiment, work unit adapter 274 may perform real-time monitoring of the execution of the sub-work unit task(s). Work unit adapter 274 may provide this monitoring information to work unit processor 415.

If it is determined that a sub-work unit task is not in an active state (block 912—NO), work unit processor 415 may continue to wait for that particular sub-unit task. If a period of time expires (e.g., a preset time, etc.) and work unit processor 415 determines that the sub-unit task has not begun execution or is not in an appropriate state (e.g., active state, etc.), an error management process may be invoked based on system parameters, error parameters, etc.

It may be determined whether previous sub-work unit task(s) in a micro-work flow are complete (block 916). As previously described, the work unit task may include multiple sub-work unit tasks which correspond to a sub-work flow or a micro-work flow. In this regard, work unit processor 415 may be managing the execution of multiple sub-work unit tasks at any instance of time depending on the work unit task, sub-work unit task dependency, sub-work unit task independence, optimization, etc. Work unit processor 415 may determine whether a sub-work unit task is complete based on, for example, receiving a sub-work unit complete message from network element 276 via work unit adapter 274, or in response to a call, as previously described.

If it is determined that previous sub-work unit task(s) in the micro-work flow are not complete (block 916—NO), a jeopardy manager may be informed (block 918). For example, as work unit processor 415 tracks the execution progress of sub-work unit task(s), work unit processor 415 ensures, among other things, that the sub-work unit task is completed in a desired timeframe (e.g., based on resource allocation, scheduling, relationship with other sub-work unit tasks, etc.). According to an exemplary embodiment, DDC resource management system 250 may include a jeopardy manager. The jeopardy manager may monitor the execution of a work order, work flow, work unit, etc. to ensure completion metrics are being met. In the event that expected completion rates are not being met, the jeopardy manager may trigger alarms and/or generate notices that indicate the scheduled completion date and/or time of the work order, work flow, work unit, etc., have gone beyond an acceptable threshold. Referring to block 916—NO, according to an exemplary embodiment, when a sub-work unit task is not completed after an estimated time period, work unit processor 415 may inform the jeopardy manager.

If it is determined that previous sub-work unit task(s) in the micro-work flow are complete (block 916—YES), content and connectors may be assembled (block 920). For example, work unit processor 415 may obtain the location of the content which a next sub-work unit task may use during execution. Additionally, work unit processor 415 may obtain the parameters pertaining to the connectors to be used by the next sub-work unit task.

The resources for a sub-work unit task may be obtained (block 922). For example, work unit processor 415 may obtain the identity of work unit adapter(s) 274 and network element(s) 276 to be used for the execution of the sub-work unit task. For example, work unit adapter 274 and network element 276 may be identified based on network address, a device identifier, etc.

Figure 9C:
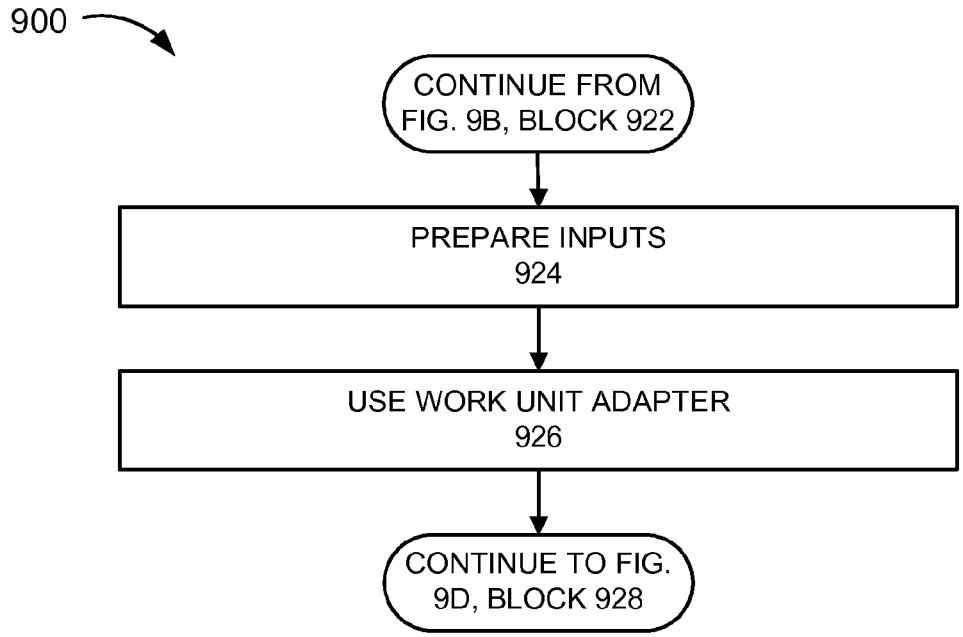

Referring to FIG. 9C, the inputs may be prepared (block 924). For example, work unit processor 415 may obtain work unit task information pertaining to the sub-work unit task.

A work unit adapter may be used (block 926). For example, work unit processor 415 may provide the work unit task information, location of content, etc., to the appropriate work unit adapter 274. In turn, work unit adapter 274 may provide the appropriate network element 276 with the work unit task information, etc.

Figure 9D:
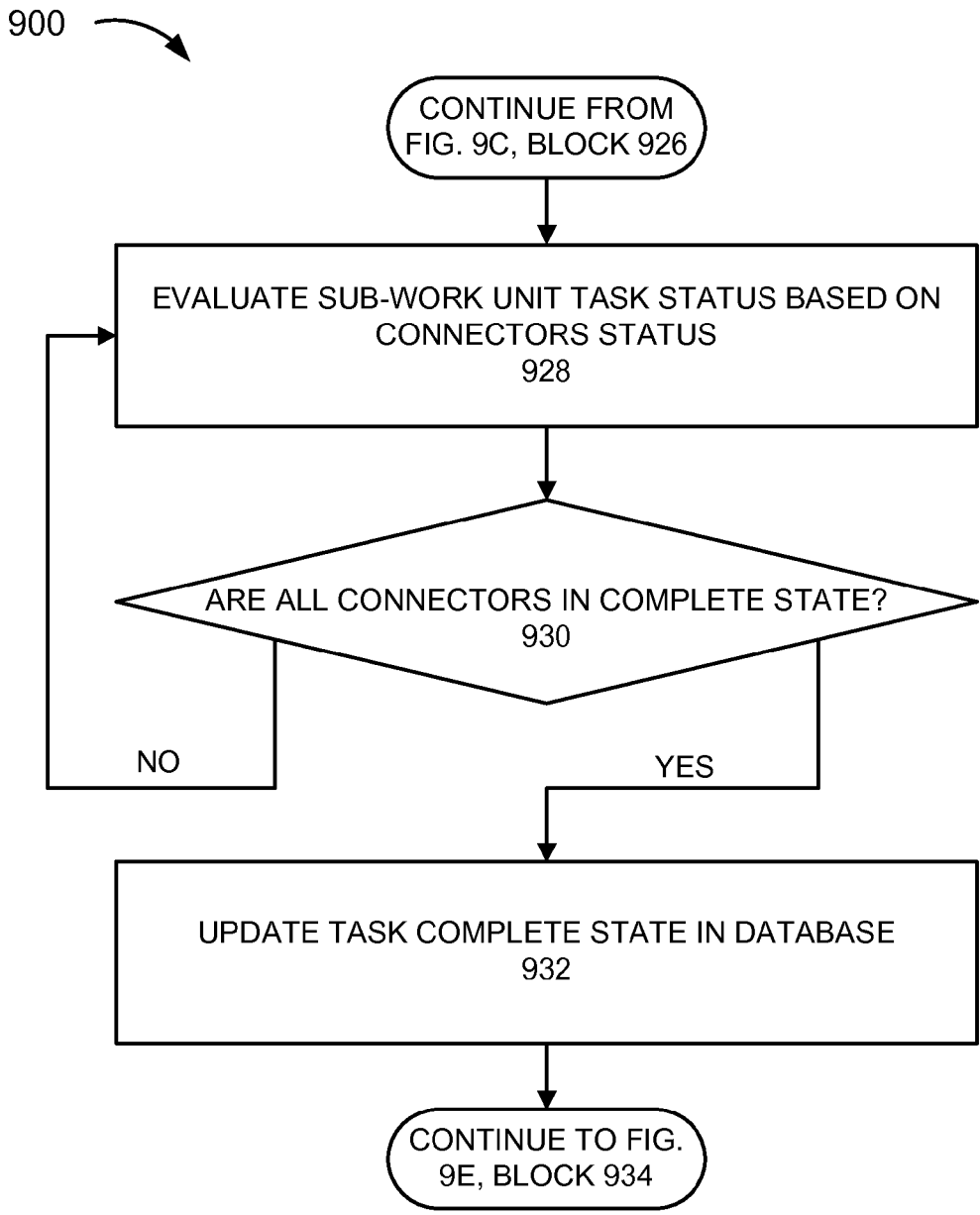

Referring to FIG. 9D, work unit processor 415 may perform various work unit task management operations. For example, with reference to a sub-work unit task that is in an in-progress state, work unit processor 415 may evaluate a sub-work unit task status based on its connector(s) status (block 928). In this way, work unit processor 415 may determine when the sub-work unit task is in a complete state. For example, as previously described with reference to FIG. 5, a work unit task connector parameter state model may include an in-process state and a complete state. Work unit processor 415 may track the state of the connector(s) (e.g., outbound connectors) for each time unit cycle of execution.

In view of the above, it may be determined whether all of the connectors associated with a sub-work unit task are in a complete state (block 930). If it is determined that the connectors are not in a complete state (block 930—NO), work unit processor 415 may continue to wait for a period of time (e.g., return to block 928). After the period of time has expired, work unit processor 415 may invoke error management processes. However, if it is determined that the connectors are in a complete state (block 930—YES), work unit processor 415 may update database 210 to indicate that the sub-work unit task is complete.

Figure 9E:
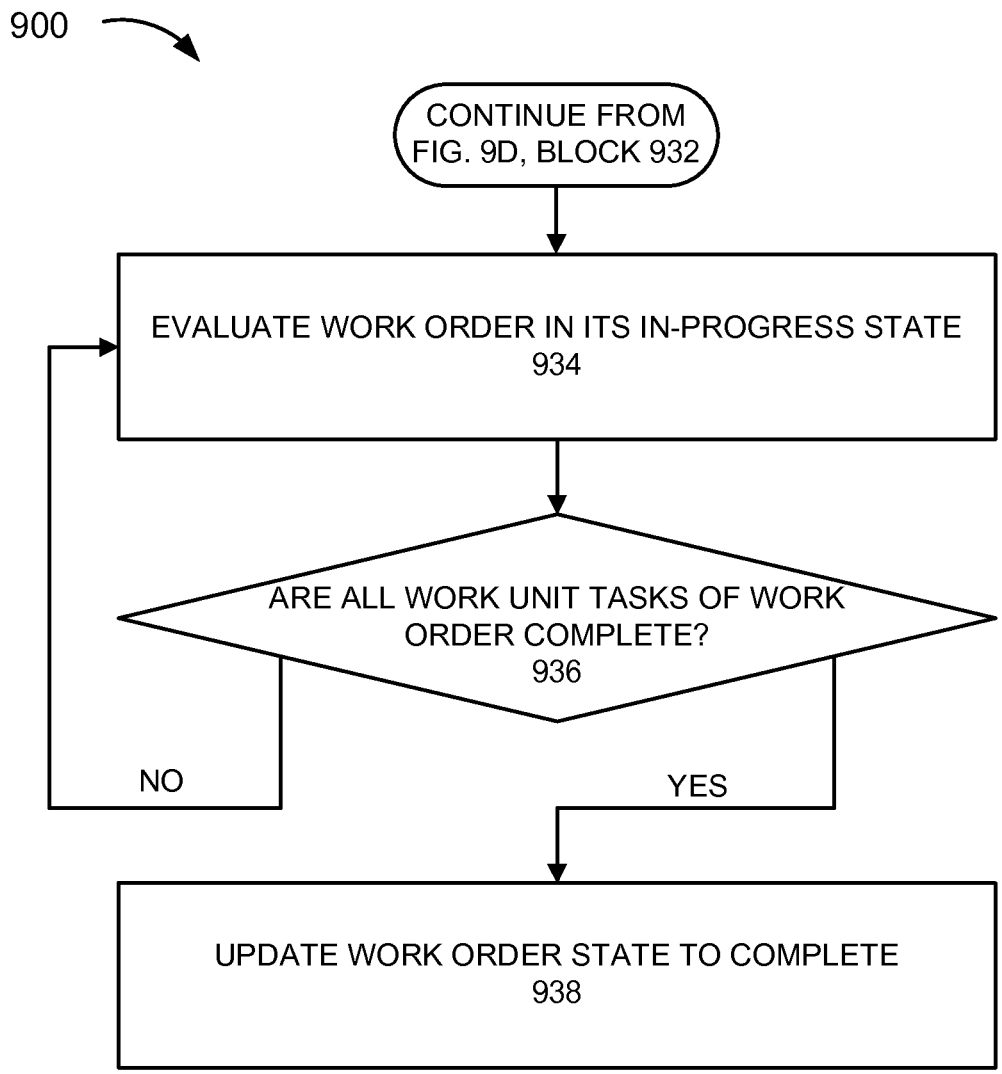

Referring to FIG. 9E, work unit processor 415 may perform various work order status management operations. For example, with reference to a work order that is in an in-process state, work unit processor 415 may evaluate a work order status based on a completion of a work unit task, a completion of a micro work flow, etc (block 934). In this way, work unit processor 415 may determine when the work unit task is in a complete state. For example, the work unit task may include multiple sub-work unit tasks, work unit processor 415 may determine whether all of the sub-work unit tasks are in a complete state (block 936). Additionally, or alternatively, work unit processor 415 may determine whether all of the work unit tasks associated with a work flow (e.g., a macro-work flow) are complete.

In view of the above, process 900 may include determining whether all of the work unit tasks of the work flow are complete (block 936). If is determined that all of the work unit tasks are not complete (block 936—NO), work unit processor 415 may continue to wait for a period of time (e.g., return to block 934). After the period of time has expired, work unit processor 415 may invoke error management processes. However, if it is determined that all of the work unit tasks are in a complete state (block 936—YES), work unit processor 415 may update database 210 to indicate that the work order is complete (block 938). According to another exemplary embodiment, work unit processor 415 may perform a similar process with respect to a micro-work flow and sub-work unit tasks.

Although FIGS. 9A-9E illustrate exemplary operations for processing a work unit task, according to other exemplary embodiments, process 900 may include additional operations, fewer operations, and/or different operations than those illustrated and described. For example, process 900 may include error handling and management operations (e.g., if an error occurs when executing the sub-work unit task) and/or other operations pertaining to the processing of a sub-work unit, as described herein.

As previously described, DDC 150 may process work orders. Described below is an exemplary process 1000 that pertains to the execution of a work flow that includes multiple work units.

Figure 10:
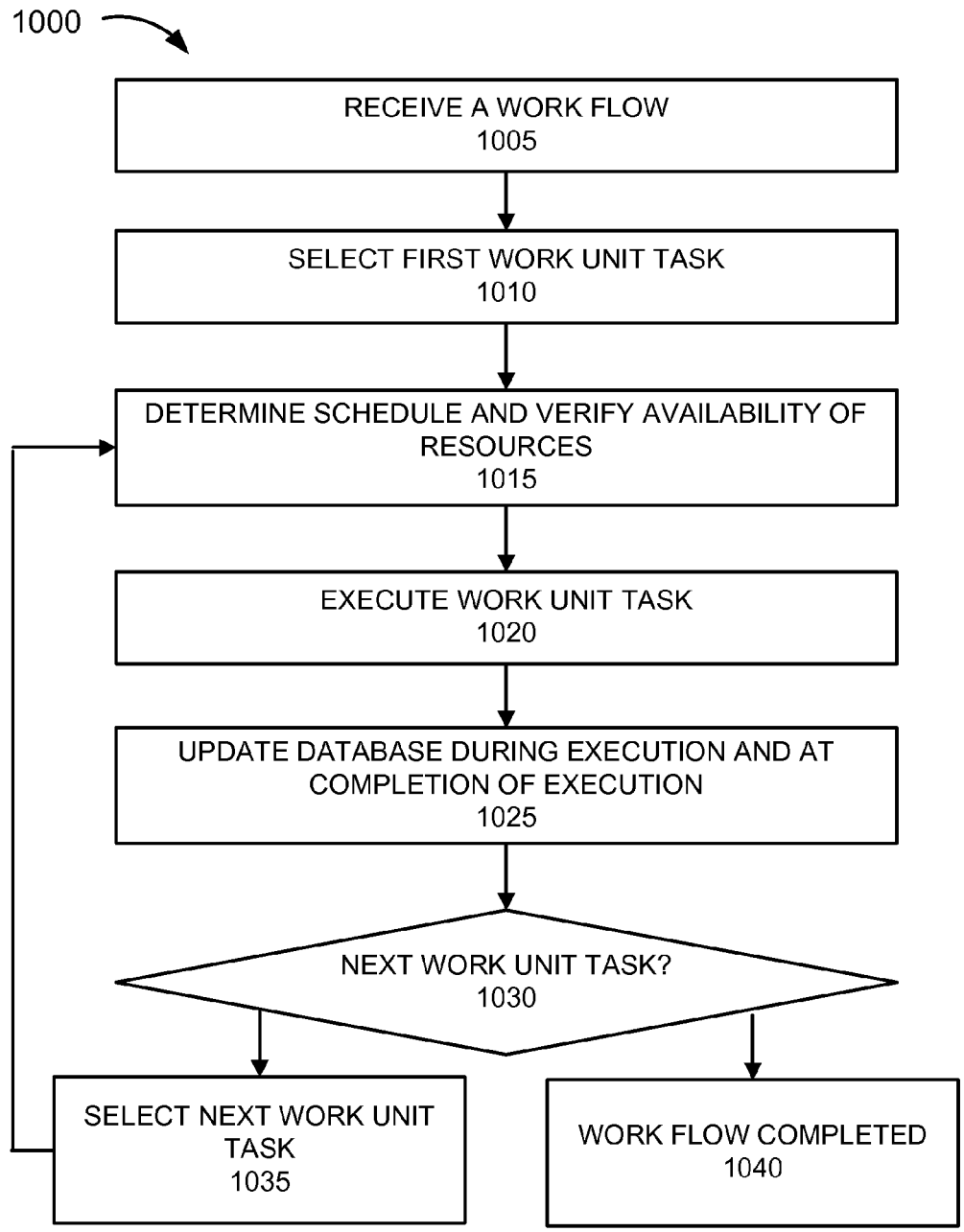
FIG. 10 is a flow diagram illustrating an exemplary process for processing a work flow.

FIG. 10 is a flow diagram illustrating an exemplary process 1000 for processing a work flow by DDC work order execution system 270.

A work flow may be received (block 1005). For example, as previously described, DDC work order execution system 270 may receive a work flow that corresponds to a work order associated with a customer order. The work flow may include one or more of ingesting content, processing content, or distributing content. The work flow may include one or more work units. According to an exemplary embodiment, work order manager 405 may receive the work flow. Work order manager 405, work order processor, and/or work unit processor 415 may perform one or more of the following processes described with respect to blocks 1010 through 1040.

A first work unit task may be selected (block 1010). DDC work order execution system 270 may select a first work unit task pertaining to the work flow. For example, an execution order of work units may be stored in database 210 which corresponds to the work flow. As previously described, according to an exemplary embodiment, a sequence for executing the work units may be based on an identifier associated with each work unit task and/or an identifier associated with a sub-work unit task. Additionally, or alternatively, according to an exemplary embodiment, the first work unit task may be selected based on other parameters or considerations, such as, for example, optimization, processes to be performed in the work flow, etc.

A schedule may be determined and the availability of resources may be verified (block 1015). DDC work order execution system 270 may determine the schedule of the work flow based on databases 210 and/or communication with other components of DDC 150 (e.g., DDC resource management system 250, etc.). DDC work order execution system 270 may also verify the availability of resources allocated for the execution of the work flow based on communications with DDC resource management system 250.

A work unit task may be executed (block 1020). DDC work order execution system 270 may execute the work unit task. For example, according to an exemplary embodiment, work unit processor 415 may select an appropriate network element 276 to execute the work unit task. Work unit processor 415 may use a work unit adapter 274 to, among other things, translate work unit task information, which may be used by network element 276 to execute the work unit task.

A database may be updated during the execution and at completion of the execution of the work unit task (block 1025). For example, DDC work order execution system 270 may update, for example, the states of the work unit task (e.g., active, in-process, complete, etc.), work unit task connectors, etc., during the execution of the work unit task and at the completion of the execution.

It may be determined whether a next work unit task is to be executed (block 1030). DDC work order execution system 270 may determine whether the work flow includes a next work unit task that has not begun execution. For example, DDC work order execution system 270 may make this determination based on information stored by databases 210 (e.g., state of work unit tasks, error handling, order of execution, etc.) and/or communication with other components of DDC 150.

If it is determined that there is a next work unit task to be executed (block 1030—YES), then a next work unit task may be selected for execution (block 1035). DDC work order execution system 270 may select the next work unit task to be executed. For example, DDC work order execution system 270 may select the next work unit task based on one or more of the state of other work unit tasks, scheduling, availability of resources, execution order of work unit tasks, dependencies between work unit tasks, errors that may have occurred, etc.

If it is determined that there is not a next work unit task to be executed (block 1030—NO), then the work flow may be completed (block 1040). DDC work order execution system 270 may determine that the work flow is completed. Depending on the work unit tasks included in the work flow, the completion of the work flow may include various processes, such as, for example, distributing content to DMR 130, saving content to databases 210, etc.

Although FIG. 10 illustrates an exemplary process 1000 for processing a work flow, according to other exemplary embodiments, process 1000 may include additional operations, fewer operations, and/or different operations than those illustrated and described. For example, process 1000 may include error handling and management operations (e.g., if an error occurs when executing the work unit task), and/or other operations pertaining to the processing of a work unit, as described herein.

In the foregoing description, DDC work order execution system 270 may provide for the execution of work orders corresponding to customer orders. Work flow command processor 272 may manage the execution of a work flow, a work unit, a sub-work unit, a micro-work flow, etc., based on various parameters and information associated with work unit tasks, other devices, components, etc., associated with DDC 150, etc.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

While series of blocks have been described with regard to exemplary processes illustrated in FIGS. 8A, 8B, 9A-9E, and 10, the order of the blocks may be modified according to other embodiments. In addition, non-dependent blocks may be performed parallel. Furthermore, other processes described in this description may be modified and/or non-dependent operations may be performed in parallel.

The exemplary embodiments described herein may be implemented in many different forms of software, firmware, and/or hardware. For example, a process or a function may be implemented as "logic" or as a "component." This logic or this component may include, for example, hardware (e.g., processing system 305, etc.), a combination of hardware and software (e.g., applications 315), a combination of hardware and firmware, or a combination of hardware, firmware, and software. The embodiments have been described without reference to a specific software code, a specific hardware or circuit configuration, etc., since the logic or the component can be designed to implement the embodiments based on the description herein.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the specification and/or drawings should be construed as critical or essential to the exemplary embodiments described herein unless explicitly described as such.

What is claimed is:

1. A method comprising:

receiving a work flow, which when executed, causes at least one of an ingestion of content, a transformation of the content, or a distribution of the content, in accordance with a customer order, wherein the work flow includes one or more work unit tasks for performing the at least one of the ingestion, the transformation, or the distribution of the content;

verifying whether resources associated with one or more adapters and one or more network elements for executing one of the one or more work unit tasks are available;

selecting the one of the one or more work unit tasks for execution when the resources are verified;

retrieving work unit task information pertaining to the one of the one or more work unit tasks, wherein the work unit task information includes a work unit definition, wherein the work unit definition includes a work unit identifier, a work unit version, one or more parallel work unit identifier and parallel work unit version pairs each of which specifies a work unit identifier and a work unit version of another work unit task that can be executed in parallel with the one of the one or more work unit tasks, and work unit task connector parameters that specify a state parameter, a type of input content and a type of output content for the one of the one or more work unit tasks;

sending the work unit task information to the one or more adapters for translation of the work unit task information from a format used by one or more devices to another format that is used by the one or more network elements for executing the one of the one or more work unit tasks;

translating, by the one or more adapters, the work unit task information;

executing the one of the one or more work unit tasks using a translated work unit task information;

monitoring a state associated with the work unit task connector parameters from a time the work flow is received to a time the executing of the one of the one or more work unit tasks is completed; and receiving a work unit task completion message that indicates that the one of the one or more work unit tasks is completed.

2. The method of claim 1, further comprising:
determining an execution order of the one or more work unit tasks based on one or more work unit task identifiers associated with the one or more work unit tasks;
selecting the one of the one or more work unit tasks to execute based on the determining; and
performing, by the one or more adapters, real-time monitoring of an execution of the one of the one or more work unit tasks.

3. The method of claim 1, wherein the transformation of the content includes at least one of creating metadata, converting metadata, splitting the content, adding an advertisement to the content, merging the content with other content, adding close captioning data to the content, transcoding the content, encoding the content, decoding the content, packaging the content, inserting logos or black space into the content, or bundling the content, and the method further comprising:
selecting the one or more adaptors to execute the one of the one or more work unit tasks based on the work unit task information; and wherein the monitoring comprises:
updating the state of the work unit task connector parameters based on triggering events including when a work order is received and when a scheduled time for processing the work order occurs.

4. The method of claim 1, further comprising:
updating one or more states associated with the one or more work unit tasks as the one of the one or more work unit tasks is being executed;
archiving previously processed content, wherein the previously processed content pertains to a previously executed workflow; and
re-using the previously processed content to satisfy another one of the one or more work unit tasks of the workflow.

5. The method of claim 1, further comprising:
receiving error handling work unit parameters;
determining when an execution of the one of the one or work unit tasks includes an error; and
using the error handling work unit parameters to manage the error.

6. The method of claim 1, further comprising:
selecting the one or more network elements based on resource information, wherein the resource information includes at least one of one or more network addresses or one or more device identifiers associated with the one or more network elements.

7. The method of claim 1, wherein the work unit definition includes a work unit state that can be any one of multiple states, wherein the multiple states include a new state, a testing state, a tested state, an active state, and an inactive state.

8. The method of claim 1, wherein the distribution of the content includes providing the content to one or more digital media retailers or one or more consumers, and wherein the work unit task information includes human intervention parameters.

9. The method of claim 1, wherein the state parameter indicates one of an in-process state or a complete state, and the method further comprises:
determining when an execution of the one of the one or more work unit tasks is complete based on the state parameter associated with the output for the one of the one or more work unit tasks.

10. A system comprising:
a memory, wherein the memory stores instructions; and
a processor, wherein the processor executes the instructions to:
receive a work flow, which when executed, causes at least one of an ingestion of content, a transformation of the content, or a distribution of the content, in accordance with a customer order, wherein the work flow includes one or more work unit tasks for performing the at least one of the ingestion, the transformation, or the distribution of the content;
verify whether resources associated with one or more adapters and one or more network elements for executing one of the one or more work unit tasks are available;
select the one of the one or more work unit tasks for execution when the resources are verified;
retrieve work unit task information pertaining to the one of the one or more work unit tasks, wherein the work unit task information includes a work unit definition, wherein the work unit definition includes a work unit identifier, a work unit version, one or more parallel work unit identifier and parallel work unit version pairs each of which specifies a work unit identifier and a work unit version of another work unit task that can be executed in parallel with the one of the one or more work unit tasks, and work unit task connector parameters that specify a state parameter, a type of input content and a type of output content for the one of the one or more work unit tasks;
send the work unit task information to the one or more adapters for translation of the work unit task information from a format used by one or more devices to another format that is used by the one or more network elements for executing the one of the one or more work unit tasks;
translate the work unit task information;
monitor an execution of the one of the one or more work unit tasks, wherein the execution uses a translated work unit task information;
monitor a state associated with the work unit task connector parameters from a time the work flow is received to a time the execution of the one of the one or more work unit tasks is completed; and
determine when the execution of the one of the one or more work unit tasks is completed based on one of the work unit task connector parameters that indicates a state pertaining to the one of the one or more work unit tasks or receipt of a work unit task reply from the one or more network elements.

11. The system of claim 10, wherein the transformation of the content includes at least one of creating metadata, converting metadata, splitting the content, adding an advertisement to the content, merging the content with other content, adding close captioning data to the content, transcoding the content, encoding the content, decoding the content, packaging the content, inserting logos or black space into the content or bundling the content.

12. The system of claim 10, wherein the work unit definition includes a work unit state that can be any one of multiple states, wherein the multiple states include a new state, a testing state, a tested state, an active state, and an inactive state.

13. The system of claim 10, wherein the processor executes the instructions to:
estimate the number of resource capacity units to execute the work flow, wherein an estimate accounts for parameters including work unit tasks needed to execute the work flow, content type, file type of content, size of content, and content compliance.

14. The system of claim 10, wherein when ingesting the content, the processor executes the instructions to retrieve the content from a content provider.

15. The system of claim 10, wherein when monitoring the execution, the processor executes the instructions to make one of a synchronous call or an asynchronous call to the one or more adapters to determine the state associated with one of the work unit task connector parameters pertaining to the one of the one or more work unit tasks.

16. The system of claim 10, wherein the processor executes the instructions to:
update one or more states associated with the one or more work unit tasks as the one of the one or more work unit tasks is being executed.

17. A non-transitory computer-readable medium comprising computer-executable instructions for execution by at least one processor, the instructions causing the at least one processor to:
receive a work flow, which when executed, causes at least one of an ingestion of content, a transformation of the content, or a distribution of the content, in accordance with a customer order, wherein the work flow includes one or more work unit tasks for performing the at least one of the ingestion, the transformation, or the distribution of the content;
verify whether resources associated with one or more adapters and one or more network elements for executing one of the one or more work unit tasks are available;
select the one of the one or more work unit tasks for execution when the resources are verified;
retrieve work unit task information pertaining to the one of the one or more work unit tasks, wherein the work unit task information includes a work unit definition, wherein the work unit definition includes a work unit identifier, a work unit version, one or more parallel work unit identifier and parallel work unit version pairs each of which specifies a work unit identifier and a work unit version of another work unit task that can be executed in parallel with the one of the one or more work unit tasks, and work unit task connector parameters that specify a state parameter, a type of input content and a type of output content for the one of the one or more work unit tasks;
send the work unit task information to the one or more adapters for translation of the work unit task information from a format used by one or more devices to another format that is used by the one or more network elements for executing the one of the one or more work unit tasks;
translate the work unit task information;
monitor an execution of the one of the one or more work unit tasks, wherein the execution uses a translated work unit task information;
monitor a state associated with the work unit task connector parameters from a time the work flow is received to a time the execution of the one of the one or more work unit tasks is completed; and
determine when the execution of the one of the one or more work unit tasks is completed based on a work unit task reply from the one or more network elements.

18. The non-transitory computer-readable medium of claim 17, wherein the instructions further cause the at least one processor to:
update one or more states associated with the one or more work unit tasks as the one of the one or more work unit tasks is being executed.

19. The non-transitory computer-readable medium of claim 17, wherein the transformation of the content includes at least one of creating metadata, converting metadata, splitting the content, adding an advertisement to the content, merging the content with other content, adding close captioning data to the content, transcoding the content, encoding the content, decoding the content, packaging the content, inserting logos or black space into the content or bundling the content.

20. The non-transitory computer-readable medium of claim 17, wherein the distribution of the content includes providing the content to one or more digital media retailers or one or more consumers, and wherein the instructions further cause the at least one processor to:
store runtime information during the execution of the one of the one or more work unit tasks.

* * * * *